(12) United States Patent
Miyamoto et al.

(10) Patent No.: US 8,448,174 B2
(45) Date of Patent: May 21, 2013

(54) INFORMATION PROCESSING DEVICE, INFORMATION PROCESSING METHOD, AND RECORDING MEDIUM

(75) Inventors: Ryo Miyamoto, Kawasaki (JP); Ryuichi Matsukura, Kawasaki (JP); Takashi Ohno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 337 days.

(21) Appl. No.: 12/692,327

(22) Filed: Jan. 22, 2010

(65) Prior Publication Data

US 2010/0192152 A1 Jul. 29, 2010

(30) Foreign Application Priority Data

Jan. 29, 2009 (JP) ................................. 2009-018558

(51) Int. Cl.
*G06F 9/46* (2006.01)

(52) U.S. Cl.
USPC ................. 718/102; 712/28; 712/29; 712/30; 712/31; 718/104; 718/105

(58) Field of Classification Search
None
See application file for complete search history.

(56) References Cited

U.S. PATENT DOCUMENTS

| 7,028,298 | B1 * | 4/2006 | Foote ............................. 718/104 |
| 2002/0087611 | A1 | 7/2002 | Tanaka |
| 2003/0097393 | A1 | 5/2003 | Kawamoto |
| 2008/0163239 | A1 * | 7/2008 | Sugumar et al. .............. 718/105 |
| 2010/0037038 | A1 * | 2/2010 | Bieswanger et al. ......... 712/220 |

FOREIGN PATENT DOCUMENTS

| JP | 2002-202959 | 7/2002 |
| JP | 4018900 | 12/2007 |
| JP | 2009-223517 | 10/2009 |

* cited by examiner

*Primary Examiner* — Emerson Puente
*Assistant Examiner* — Sisley Kim
(74) *Attorney, Agent, or Firm* — Fujitsu Patent Center

(57) ABSTRACT

An information processing device which has a plurality of process units for performing various kinds of processes includes a detecting unit that detects a processing loads of the process units; a determining unit that determines whether a total amount of the processing loads detected by the detecting unit is equal to or larger than a specific value; a designating unit that designates a process unit having a process state to be controlled, based on the processing loads of the process units detected by the detecting unit, when the determining unit determines that the total amount is equal to or larger than the specific value; a process identifying unit that identifies a process having an execution state to be controlled among processes being performed by the process unit designated by the designating unit; and a control unit that controls the execution state of the process identified by the process identifying unit.

9 Claims, 23 Drawing Sheets

FIG. 3A

| INPUT/OUTPUT DEVICE ID |
|---|
| Dev1 |
| Dev2 |
| Dev3 |

| USER ID | PASSWORD |
|---|---|
| UserA | AAA |
| UserB | BBB |
| UserC | CCC |

| VM-ID | USER ID |
|---|---|
| VM-A | UserA |
| VM-B | UserB |
| VM-C | UserC |

| APPLICATION ID | APPLICATION NAME | CONTROL METHOD |
|---|---|---|
| 1 | WEB BROWSER | STOP |
| 2 | TEXT EDITING APPLICATION | STOP |
| 3 | OFFICE APPLICATION | SUSPEND |
| 4 | VIDEO VIEWING APPLICATION | SUSPEND |

| VM-ID | INPUT/OUTPUT DEVICE ID |
|---|---|
| VM-A | Dev1 |
| VM-B | Dev2 |

| VM-ID | CONTROL STATE INFORMATION | LOAD FLUCTUATION (%) |
|---|---|---|
| VM-A | CONTROLLED | 30 |
| VM-B | UNCONTROLLED | 0 |

4f

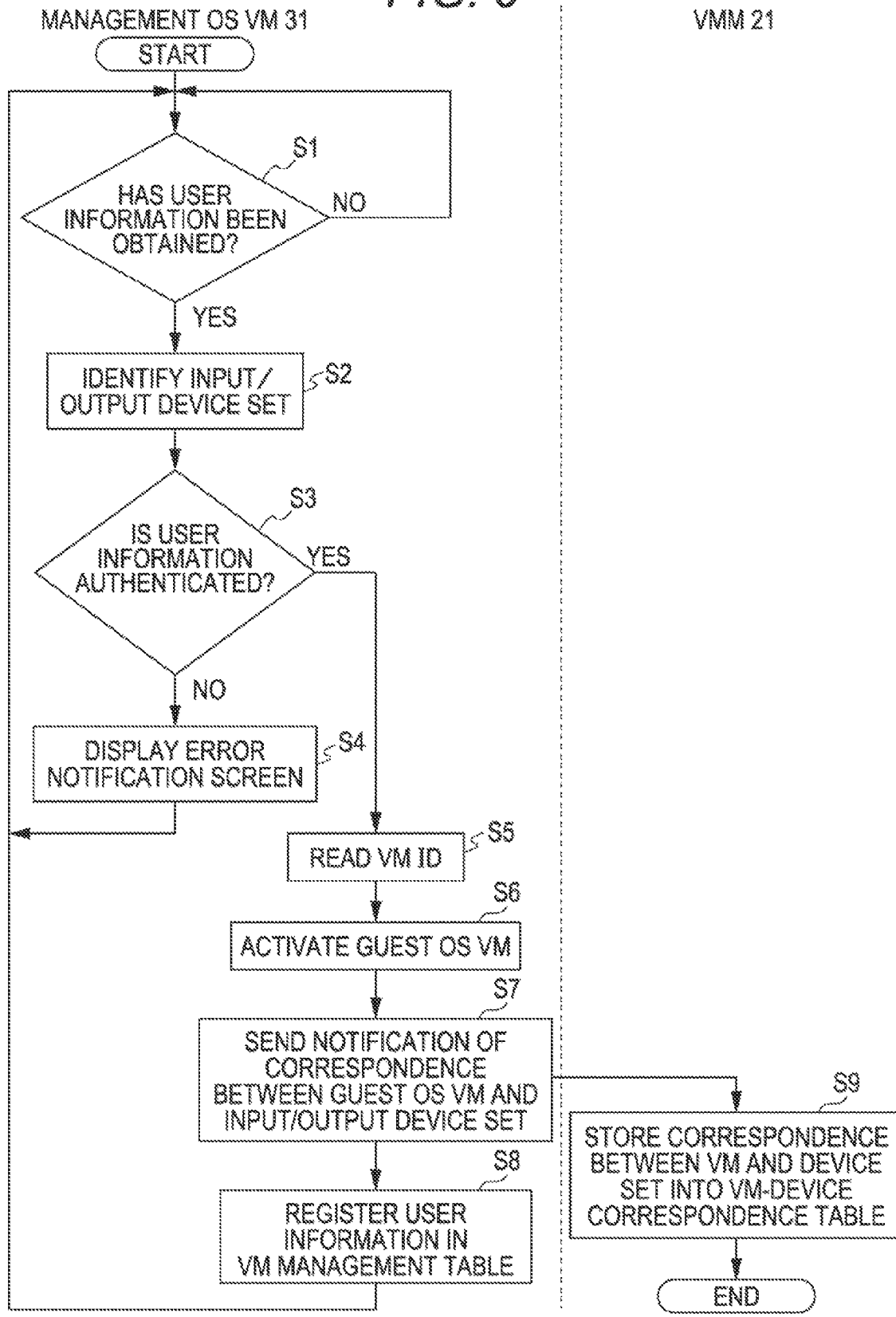

FIG. 18

| VM-ID | ALLOWABLE CPU LOAD (%) |
|---|---|
| VM-A | 35 |
| VM-B | 65 |
| VM-C | 35 |

FIG. 22A
```
BOOL SetPriorityClass(
    HANDLE hProcess,
    DWORD BELOW_NORMAL_PRIORITY_CLASS
);
```

FIG. 22B
```
BOOL SetPriorityClass(
    HANDLE hProcess,
    DWORD IDLE_PRIORITY_CLASS
);
``` ously, the virtual machine performing the process with a large processing load might affect the usage environments of the other virtual machines, and the operability of the other virtual machines might become lower.

INFORMATION PROCESSING DEVICE, INFORMATION PROCESSING METHOD, AND RECORDING MEDIUM

CROSS-REFERENCE TO RELATED APPLICATIONS

This application is based upon and claims the benefit of priority of the prior Japanese Patent Application No. 2009-18558, filed on Jan. 29, 2009, the entire contents of which are incorporated herein by reference.

FIELD

The Embodiments relate to an information processing device that may perform as a plurality of virtual devices according to a virtualization technique. The Embodiments also relate to an information processing method and a recording medium.

BACKGROUND

In recent years, virtual machine (VM) techniques have been drawing attention. A "virtual machine technique" is a technique by which the hardware resources in one computer are logically divided, and the computer virtually functions as a plurality of independent computers (virtual machines). As the functions of virtual machines are realized with a single computer in this manner, the single computer can be shared among a plurality of users.

In most cases, the hardware resources used and/or necessary for a process are allocated every time a virtual machine performs a process in such a computer. However, there is a limit to the hardware resources that can be retained by a computer, and therefore, the amount of hardware resources to be allocated varies among the virtual machines of users, depending on the usage states of the virtual machines. If there is a virtual machine performing a process with a large processing load, sufficient hardware resources cannot be allocated to the other virtual machines. In such a situation, the virtual machine performing the process with a large processing load might affect the usage environments of the other virtual machines, and the operability of the other virtual machines might become lower.

In view of the above, a system has been suggested to reconfigure the allocation of hardware resources to virtual machines when differences are seen among the amounts of hardware resources allocated to the respective virtual machines (see Japanese Laid-open Patent Publication No. 2002-202959 and Japanese Patent No. 4,018,900, for example).

SUMMARY

An aspect of the present invention is directed towards an information processing device which has a plurality of process units for performing various kinds of processes. The information processing device includes a detecting unit that detects a processing loads of the process units; a determining unit that determines whether a total amount of the processing loads detected by the detecting unit is equal to or larger than a specific value; a designating unit that designates a process unit having a process state to be controlled, based on the processing loads of the process units detected by the detecting unit, when the determining unit determines that the total amount is equal to or larger than the specific value; a process identifying unit that identifies a process having an execution state to be controlled among processes being performed by the process unit designated by the designating unit; and a control unit that controls the execution state of the process identified by the process identifying unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A, 3B, 3C, and 3D illustrate the contents included in tables;

FIGS. 4A and 4B illustrate the contents included in tables;

FIG. 9 illustrates the processing performed by the management OS VM to activate a guest OS VM;

FIG. 18 illustrates the contents included in a preference table;

FIGS. 22A and 22B illustrate the configuration information to be used in an operation to lower the priority level when the CPU is allocated.

DESCRIPTION OF EMBODIMENTS

The following is a description of embodiments of information processing devices, information processing methods, and computer programs disclosed in the embodiments, with reference to the accompanying drawings. In the following, embodiments in which the information processing devices disclosed in the embodiments are applied to personal computers (hereinafter referred to as PCs) are explained.

First Embodiment

Figure 1:
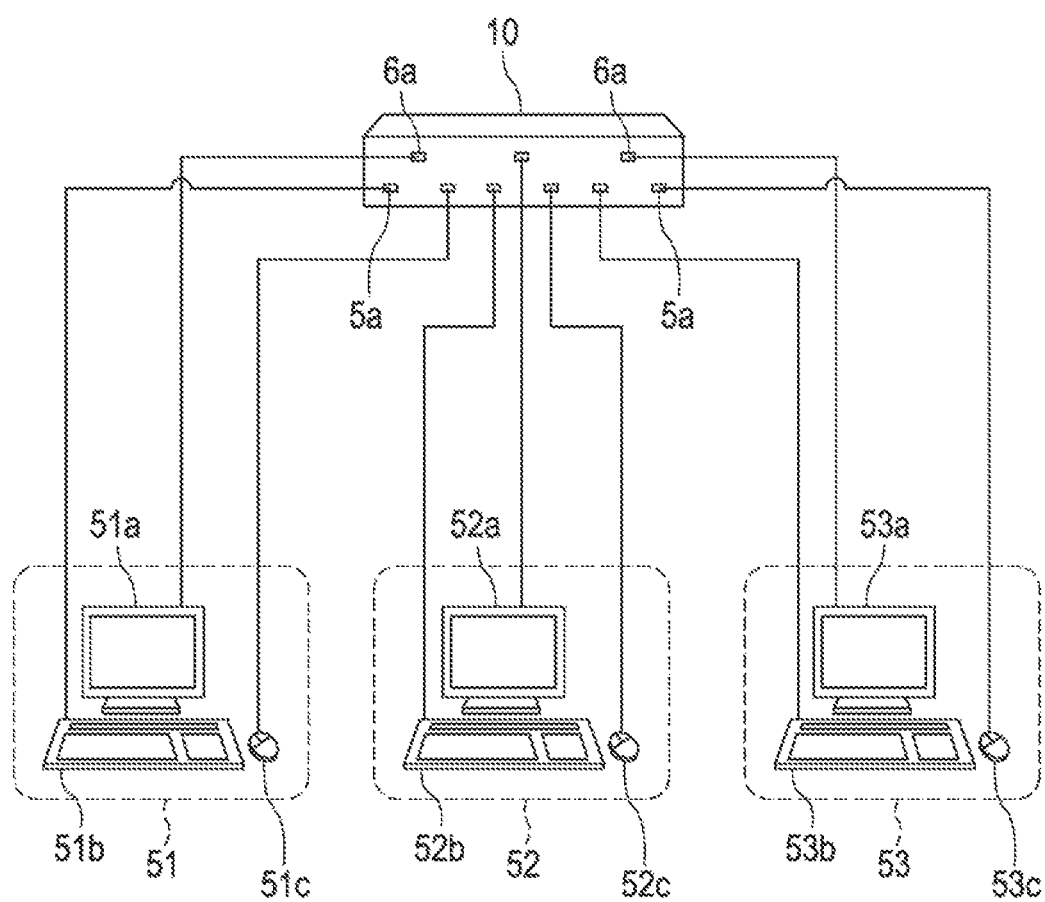
FIG. 1 illustrates the general configuration of a PC of a first embodiment.

A PC according to a first embodiment is now described. FIG. 1 illustrates the general configuration of the PC of the first embodiment. The PC 10 of the first embodiment includes six USB (Universal Serial Bus) ports 5a and three monitor connecting ports 6a, for example. In FIG. 1, the six ports arranged in the horizontal direction in the lower portion of a side face of the PC 10 are the USB ports 5a, and the three ports arranged in the horizontal direction in the upper portion of the USB ports 5a are the monitor connecting ports 6a.

Three keyboards 51b, 52b, and 53b, and three mouses 51c, 52c, and 53c are connected to the PC 10 of the first embodiment via USB cables connected to the USB ports 5a. Three monitors 51a, 52a, and 53a are also connected to the PC 10 of the first embodiment via monitor connecting cables connected to the monitor connecting ports 6a.

Accordingly, three input/output device sets 51, 52, and 53 that include the monitors 51a, 52a, and 53a, the keyboards 51b, 52b, and 53b, and the mouses 51c, 52c, and 53c, respectively, can be mounted on the PC 10 of the first embodiment. However, PCs to which the information processing devices disclosed in the embodiments can be applied are not limited to the above configuration. For example, the number of USB ports 5a is not limited to six, and the number of monitor connecting ports 6a is not limited to three. Also, the information processing devices disclosed in the embodiments can also be applied to PCs 10 in which a USB hub is connected to one of the USB ports 5a, and keyboards and mouses are connected via the USB hub.

Figure 2:
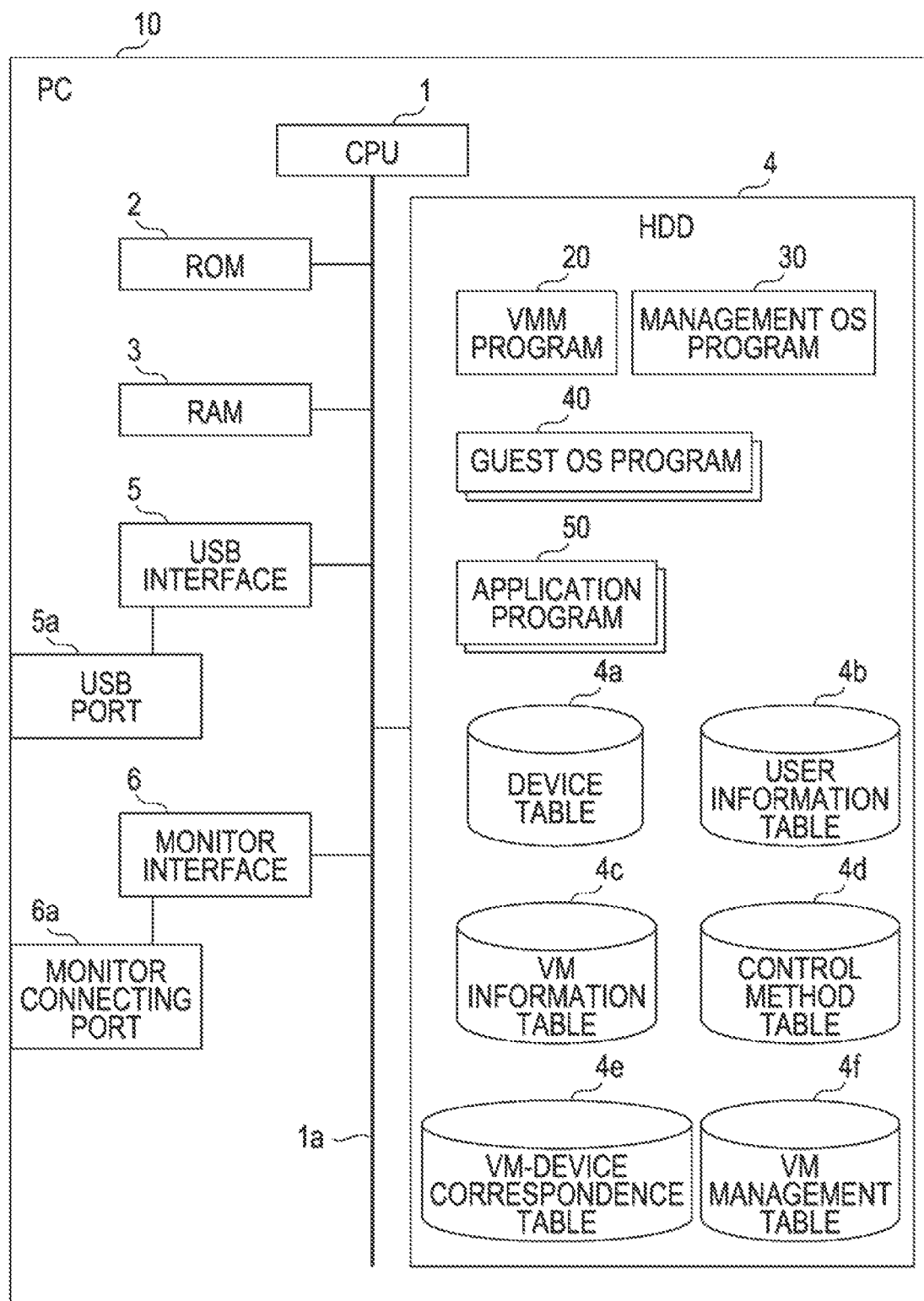
FIG. 2 illustrates the general configuration of the PC of the first embodiment.

FIG. 2 illustrates the general configuration of the PC 10 of the first embodiment. The PC 10 of the first embodiment includes hardware components such as a CPU (Central Processing Unit) 1, a ROM (Read Only Memory) 2, a RAM (Random Access Memory) 3, a hard disk drive (hereinafter referred to as a HDD) 4, a USB interface 5, and a monitor interface 6. The respective hardware components are connected to one another via a bus 1a.

The CPU 1 loads a control program stored beforehand in the ROM 2 or the HDD 4 into the RAM 3, and executes the control program as needed. The CPU 1 also controls processes of the respective hardware components.

In the ROM 2, various control programs used and/or necessary for operating the PC 10 as an information processing device disclosed in the embodiments are stored in advance. The RAM 3 is a SRAM (Static RAM), a DRAM (Dynamic RAM), a flash memory, or the like. The RAM 3 temporarily stores various kinds of data generated when the CPU 1 executes a control program.

The HDD 4 is a large-capacity storage device. The HDD 4 stores various control programs used and/or necessary for operating the PC 10 as an information processing device disclosed in the embodiments, various kinds of data, and the like. More specifically, the HDD 4 stores the control programs to be read and executed by the CPU 1, such as a VMM program 20, a management OS program 30, three guest OS programs 40, and application programs 50, for example.

The HDD 4 also includes a device table 4a illustrated in FIG. 3A, a user information table 4b illustrated in FIG. 3B, a VM information table 4c illustrated in FIG. 3C, and a control method table 4d illustrated in FIG. 3D. The HDD 4 further includes a VM-device correspondence table 4e illustrated in FIG. 4A and a VM management table 4f illustrated in FIG. 4B.

The six USB ports 5a are connected to the USB interface 5. The USB interface 5 exchanges data with devices connected to the USB ports 5a via the USB cables connected to the respective USB ports 5a. The USB interface 5 of the first embodiment is connected to the keyboards 51b, 52b, and 53b, and the mouses 51c, 52c, and 53c via the USB cables. Accordingly, the USB interface 5 exchanges data with the keyboards 51b, 52b, and 53b, and the mouses 51c, 52c, and 53c.

The keyboards 51b, 52b, and 53b, and the mouses 51c, 52c, and 53c include various operation detecting devices, which users may use to operate the PC 10. When users operate operation keys, the keyboards 51b, 52b, and 53b, and the mouses 51c, 52c, and 53c transmit control signals corresponding to the operated operation keys, to a corresponding management OS (Operating System) 31a or guest OSs (Operating Systems) 41a, 42a, and 43a (see FIG. 5 and FIG. 6). The management OS 31a and the guest OSs 41a, 42a, and 43a perform processes in accordance with the control signals obtained from the keyboards 51b, 52b, and 53b, and the mouses 51c, 52c, and 53c.

The three monitor connecting ports 6a are connected to the monitor interface 6. The monitor interface 6 of the first embodiment is connected to the monitors 51a, 52a, and 53a via monitor connecting cables connected to the monitor connecting ports 6a. With this arrangement, the monitor interface 6 exchanges data with the monitors 51a, 52a, and 53a.

Each of the monitors 51a, 52a, and 53a is a liquid crystal display, a CRT (Cathode Ray Tube) display, or the like. In accordance with the data transmitted from the corresponding management OS 31a or the guest OSs 41a, 42a, and 43a, via the monitor interface 6, the monitors 51a, 52a, and 53a display the operating state of the PC 10 (VM), information that is input by users, information of which the users should be notified, and the like.

Figure 5:
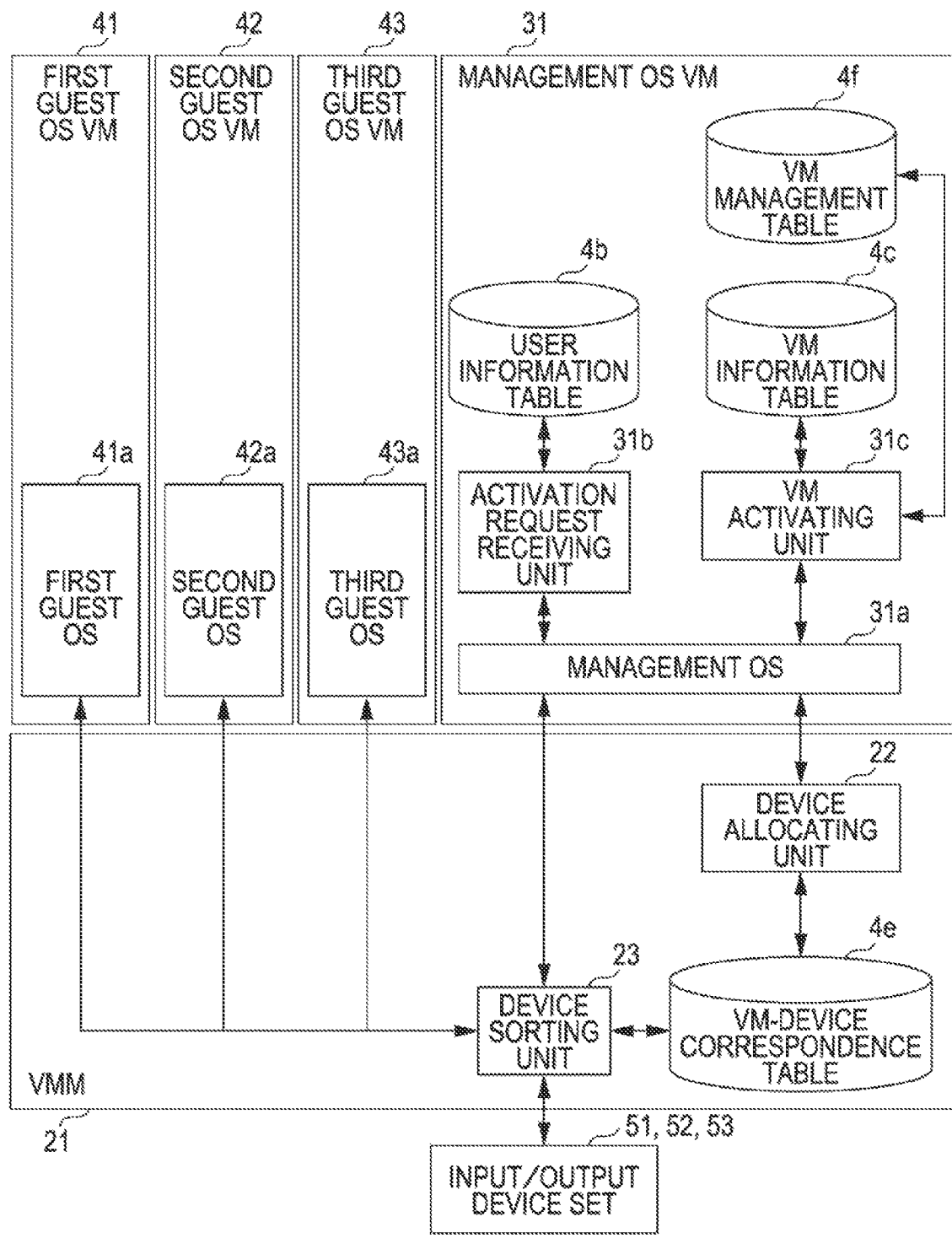
FIG. 5 illustrates a functional configuration of the PC of the first embodiment.
Figure 6:
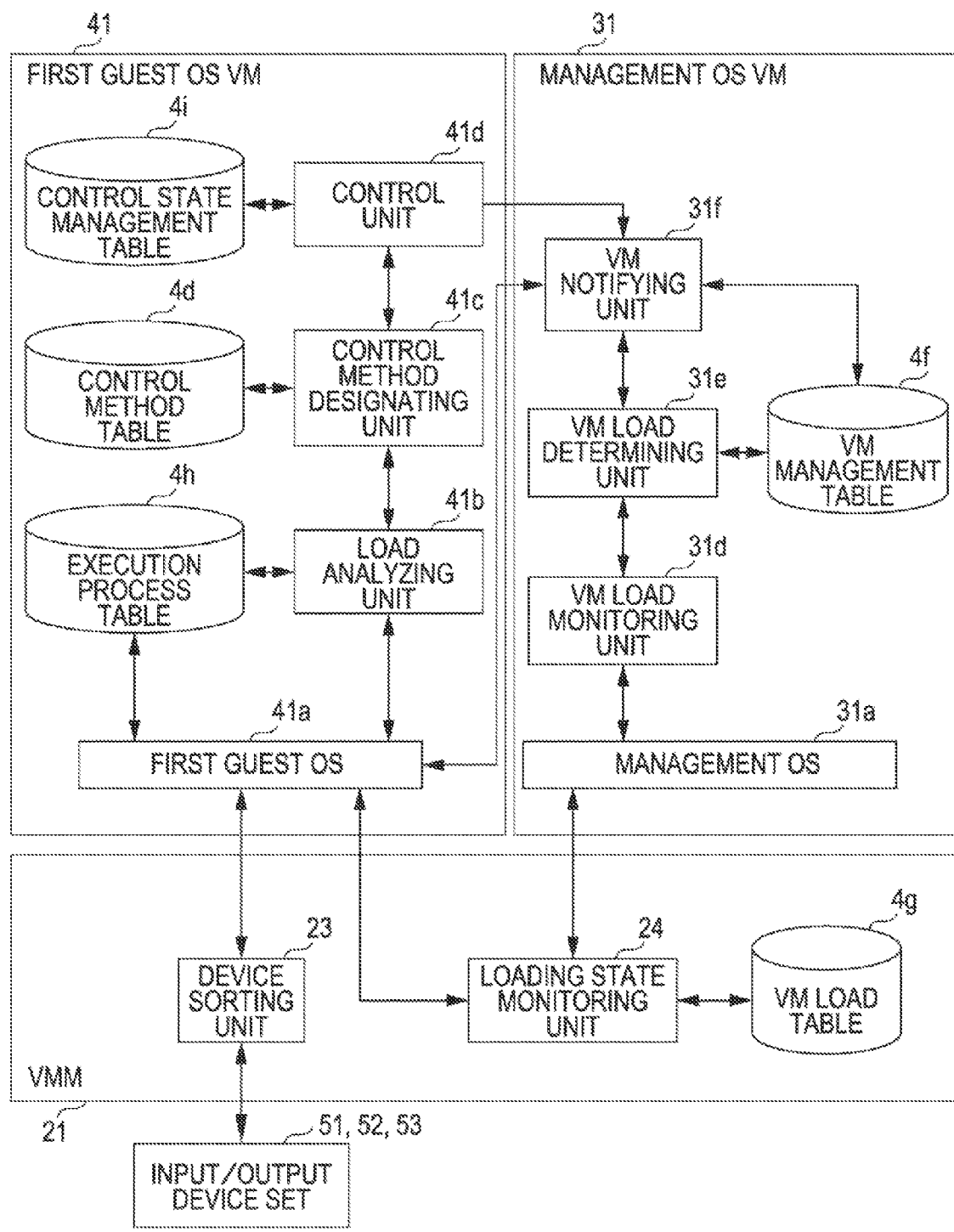
FIG. 6 illustrates a functional configuration of the PC of the first embodiment.

In the PC 10 having the above configuration, the CPU 1 loads the VMM (Virtual Machine Monitor) program 20, the management OS program 30, the guest OS programs 40 from the HDD 4 into the RAM 3, and executes those programs, so as to function as a VMM 21, the management OS 31a, and the guest OSs 41a, 42a, and 43a (see FIG. 5 and FIG. 6).

The VMM program 20 is a software program for realizing a virtualization technique by which a plurality of (e.g., four in the first embodiment) OSs (e.g., the management OS 31a and the guest OSs 41a, 42s, and 43a) operate in the PC 10. After the PC 10 is activated, the CPU 1 executes the VMM program 20, to start a process as the VMM 21. By functioning as the VMM 21, the CPU 1 logically functions as a plurality of CPUs 1. In a case where a multi-core CPU is used as the CPU 1, the VMM 21, the management OS 31a, and the guest OSs 41a, 42a, and 43a can be allocated to and operated on physically different CPU cores, for example. However, it is of course possible to use a single-core CPU as the CPU 1.

Since the CPU 1 functions as the VMM 21, the PC 10 provides a virtual environment in which the PC 10 logically functions as a plurality of PCs (a management OS VM 31, a first guest OS VM 41, a second guest OS VM 42, and a third guest OS VM 43). With this arrangement, four independent virtual machines (VM) logically operate in one PC 10.

The VMM 21 realizes the management between the software and each hardware resource, and controls the basic processes of the hardware for the management OS 31a and the guest OSs 41a, 42a, and 43a. For example, when activating the management OS 31a and the guest OSs 41a, 42a, and 43a, the VMM 21 allocates the hardware such as the CPU 1, the RAM 3, the HDD 4, and the input/output devices sets 51, 52, and 53, to the management OS 31a and the guest OSs 41a, 42a, and 43a.

The RAM 3 is used when the CPU 1 reads out the VMM program 20, the management OS program 30, the guest OS programs 40, and the like from a computer-readable storage medium. The RAM 3 temporarily stores various kinds of information when the CPU 1 reads and executes the respective control programs, and performs the respective processes. The RAM 3 is also used to store the configuration information of each of the management OS 31a and the guest OSs 41a, 42a, and 43a, when the CPU 1 functions as the management OS 31a and the guest OSs 41a, 42a, and 43a. Accordingly, the RAM 3 is also divided logically into a plurality of RAMs 3 by the VMM 21, and is allocated to the VMM 21, the management OS 31a, and the guest OSs 41a, 42a, and 43a.

The management OS program 30 is a software program, which may be stored on computer-readable storage media, that is to maintain appropriate processes of the guest OSs 41a, 42a, and 43a. Generally, there are no interfaces prepared for users to operate, such as a CUI (Command User Interface) and a GUI (Graphic User Interface). The CPU 1 executes the management OS program 30 after activation of the PC 10, to start a process as the management OS 31a. The management OS program 30 may include a CUI and a GUI, each of which may be operated by a manager.

The guest OS programs 40 are OS software programs, which may be stored on computer-readable storage media, such as Windows (a registered trade name) and Linux, which include CUIs and GUIs that may be operated by users. When the management OS 31a issues an instruction to activate one of the guest OS VMs 41, 42, and 43, the CPU 1 executes the corresponding one of the guest OS programs 40, to start a process as the corresponding one of the guest OSs 41a, 42a, and 43a.

The guest OSs 41a, 42a, and 43a generate display screens including the CUIs and GUIs to be displayed in accordance with processes being performed. The display screens are displayed on the respective monitors 51a, 52a, and 53a associated with the guest OSs 41a, 42a, and 43a, respectively. The guest OSs 41a, 42a, and 43a also receive controls signals from the keyboards 51b, 52b, and 53b, and the mouses 51c, 52c, and 53c associated with the guest OSs 41a, 42a, and 43a, respectively. The guest OSs 41a, 42a, and 43a function as the operating units that perform various kinds of processes in accordance with the received control signals. The guest OSs 41a, 42a, and 43a detect the processing load of the respective guest OS VMs 41, 42, and 43, and notify the VMM 21 of the detected processing load as requested and/or needed. The processing load may be the CPU usage rate, for example.

The application programs 50 are software programs, which may be saved are computer-readable media, to be executed by the guest OSs 41a, 42a, and 43a. The PC 10 may load the application programs 50 from an external memory into the HDD 4, for example. In a case where the PC 10 includes a communication unit for establishing a connection with a network, the PC 10 may download the application programs 50 via the network, and store the application programs 50 into the HDD 4.

FIG. 3A illustrates the contents included in the device table 4a. FIG. 3B illustrates the contents included in the user information table 4b. FIG. 3C illustrates the contents included in the VM information table 4c. FIG. 3D illustrates the contents included in the control method table 4d. FIG. 4A illustrates the contents included in the VM-device correspondence table 4e. FIG. 4B illustrates the contents included in the VM management table 4f.

As illustrated in FIG. 3A, the device table 4a includes the input/output device IDs allocated to all the input/output device sets 51, 52, and 53 connected to the PC 10, for example. The contents of the device table 4a may be registered during the initializing operation for the PC 10. Here, the monitors 51a, 52a, and 53a, the keyboards 51b, 52b, and 53b, and the mouses 51c, 52c, and 53c are collectively regarded as the input/output device sets 51, 52, and 53.

As illustrated in FIG. 3B, the user information table 4b includes the user IDs of users who are allowed to use the PC 10, and the passwords that are registered by the users in advance, for example. The user IDs are associated with the passwords. The contents of the user information table 4b may be registered during the initializing operation for the PC 10. When a user changes his/her own password while using his/her own VM (the guest OS VM 41, 42, or 43), the contents of the user information table 4b are changed by the corresponding one of the guest OSs 41a, 42a, and 43a.

As illustrated in FIG. 3C, the VM information table 4c includes the VM IDs for identifying the guest OS VMs 41, 42, and 43 constructed by the CPU 1 executing the respective guest OS programs 40, and the user IDs for identifying the users to whom the respective guest OS VMs 41, 42, and 43 are allocated. The VM IDs are associated with the user IDs. The contents of the VM information table 4c may be registered during the initializing operation for the PC 10. For example, only the users having their user IDs included in the VM information table 4c may be able to use the PC 10. Each of the guest OS VMs 41, 42, and 43 stores the user ID of the user allocated thereto, various kinds of configuration information set by the user, and the like, into the RAM 3 or the HDD 4 allocated thereto.

As illustrated in FIG. 3D, the control method table 4d includes the application IDs and application names for identifying the application programs 50, and the control methods, which may be set beforehand, for the respective application programs 50. The application IDs and application names are associated with the control methods. The contents of the control method table 4d are registered beforehand by the manager who manages the PC 10, for example. The contents of the control method table 4d may be changed by the manager of the PC 10.

As illustrated in FIG. 4A, the VM-device correspondence table 4e includes the VM IDs of the guest OS VMs 41, 42, and 43, and the input/output device IDs representing the input/output device sets 51, 52, and 53 associated with the guest OS VMs 41, 42, and 43, respectively. The VM IDs are associated with the input/output device IDs. The contents of the VM-device correspondence table 4e are registered by the management OS 31a, every time the input/output device set 51, 52, or 53 is associated with the corresponding one of the guest OSs 41a, 42a, and 43a when the management OS 31a activates the guest OS 41a, 42a, or 43a, for example. Also, the contents of the VM-device correspondence table 4e are deleted by the management OS 31a, when the guest OSs 41a, 42a, and 43a stop operating, for example.

As illustrated in FIG. 4B, the VM management table 4f includes the VM IDs of the guest OS VMs 41, 42, and 43, the control state information indicating whether process being performed by each of the guest OS VMs 41, 42, 43 is controlled (restricted), and the load fluctuations representing the amount of the load that is controlled where the process control is performed. The VM IDs, the control state information, and the load fluctuations are associated with one another. The contents of the VM management table 4f are registered by the management OS 31a, when the management OS 31a activates the guest OSs 41a, 42a, and 43a, for example.

As illustrated in FIG. 4B, the management OS 31a stores "uncontrolled" as the control state information, and "0" as the load fluctuation in association with the ID of VM-B. The contents of the VM management table 4f are updated by the management OS 31a, every time the management OS 31a controls the execution state of the application program 50 being executed by one of the guest OSs 41a, 42a, and 43a, or every time the management OS 31a stops controlling the execution state, for example.

The following is a description of the functions and/or operations to be realized by the CPU 1 executing the various kinds of control programs stored in the ROM 2 or the HDD 4 in the PC 10 having the above configuration. FIG. 5 and FIG. 6 are functional configuration of the PC 10 of the first embodiment. FIG. 5 and FIG. 6 illustrate the principles of the PC 10 functioning as a plurality of PCs (VMs) according to a virtualization technique.

As illustrated in FIGS. 5 and 6, the four VMs (e.g., the management OS VM 31, the first guest OS VM 41, the second guest OS VM 42, and the third guest OS VM 43) can be executed independently of one another by the VMM 21 in the PC 10. The VMM 21 operates by the hardware including the CPU 1, the RAM 3, the HDD 4, the input/output device sets 51, 52, and 53, and the like. Although FIG. 6 does not depict the second guest OS VM 42 and the third guest OS VM 43, the second guest OS VM 42 and the third guest OS VM 43 each have the same configuration as the first guest OS VM 41. In this specification, the first guest OS VM 41, the second guest OS VM 42, and the third guest OS VM 43 may also be referred to simply as the guest OS VMs 41, 42, and 43, and the first guest OS 41a, the second guest OS 42a, and the third guest OS 43a may also be referred to simply as the guest OSs 41a, 42a, and 43a.

The VMM 21 of the first embodiment may include one or more of the functions of a device allocating unit 22, a device sorting unit 23, a loading state monitoring unit 24, and the like, which are realized by the modules included in the VMM program 20. The management OS VM 31 of the first embodiment may include one or more of the functions of a management OS 31a, an activation request receiving unit 31b, a VM activating unit 31c, a VM load monitoring unit 31d, a VM load determining unit 31e, a VM notifying unit 31f, and the like, which are realized by the modules included in the management OS program 30. The guest OS VM 41 of the first embodiment may include one or more of the functions of a guest OS 41a, a load analyzing unit 41b, a control method designating unit 41c, a control unit 41d, and the like, which are realized by the module included in the corresponding guest OS program 40.

When the PC 10 of the first embodiment is switched on and the respective hardware components of the PC 10 are activated, the CPU 1 first reads the VMM program 20 from the HDD 4, and executes the VMM program 20, to start a process as a VMM (virtual machine monitor) 21.

After the activation, the VMM 21 reads the management OS program 30 from the HDD 4, and executes the management OS program 30, to cause the management OS 31a to start operating. Here, the VMM 21 allocates the hardware to be used by the management OS 31a and the like, and then activates the management OS VM 31.

After the activation of the management OS VM 31, all the input/output device sets 51, 52, and 53 are allocated to the management OS 31a. For example, immediately after the activation of the management OS VM 31, all the input/output device sets 51, 52, and 53 are allocated to the management OS 31a. Accordingly, the management OS 31a is connected to all the input/output device sets 51, 52, and 53 via the device sorting unit 23 of the VMM 21. Also, after, or immediately after, the activation, the management OS 31a causes all the monitors 51a, 52a, and 53a to display the login screen illustrated in FIG. 7A.

Figure 7A:
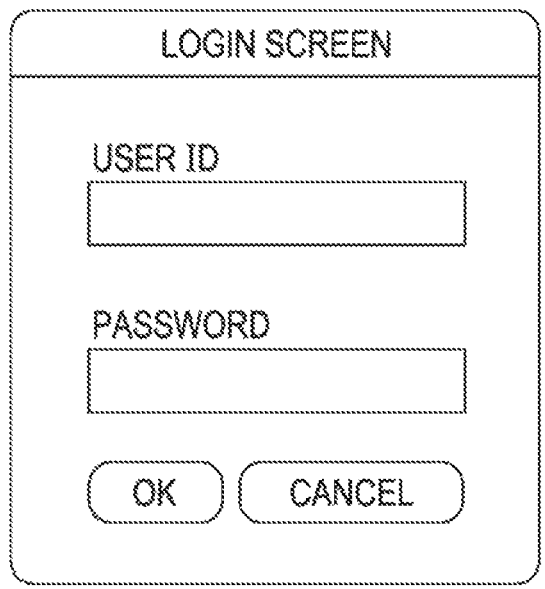
FIGS. 7A, 7B, and 7C illustrate the layout of display screens.
Figure 7B:
Figure 7C:
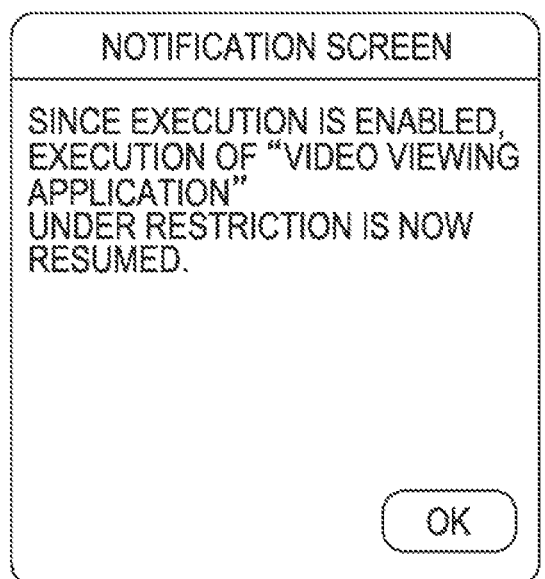

FIG. 7A, FIG. 7B and FIG. 7C illustrate the layout of display screens. The login screen illustrated in FIG. 7A displays a user ID input box, a password input box, an OK button, and a cancel button. A user who wishes to use the PC 10 uses one of the input/output device sets 51, 52, and 53, and inputs a user ID and a password.

In a case where a user ID and a password are input with the use of one of the input/output device sets 51, 52, and 53, and the OK button is selected, the used input/output device set 51, 52, or 53 transmits the input user ID and the input password to the management OS 31a. The input/output device set 51, 52, or 53 transmits the user ID and the password to the management OS 31a via the device sorting unit 23 of the VMM 21.

When the user ID and password transmission from one of the input/output device sets 51, 52, and 53 to the management OS 31a is started, the device sorting unit 23 prohibits data transfers from the other ones of the input/output device sets 51, 52, and 53 to the management OS 31a. By doing so, simultaneous data transfers from a plurality of input/output device sets 51, 52, and 53 to the management OS 31a can be prevented.

After obtaining the user ID and the password from the one of the input/output device sets 51, 52, and 53, the management OS 31a identifies the one of the input/output device sets 51, 52, and 53, which has transmitted the user ID and the password. The management OS 31a then transmits the obtained user ID and the password to the activation request receiving unit 31b.

After obtaining the user ID and the password from the management OS 31a, the activation request receiving unit 31b performs an authentication procedure, based on the contents of the user information table 4b. More specifically, the activation request receiving unit 31b determines whether the obtained user ID and password are included in the user information table 4b. When determining that the obtained user ID and password are included in the user information table 4b, the activation request receiving unit 31b sends the management OS 31a a response to the effect that the user ID and password are authenticated.

When determining that the obtained user ID and password are not included in the user information table 4b, the activation request receiving unit 31b sends the management OS 31a a response indicating that the user ID and password are not authenticated. Receiving the response indicating that the user ID and the password are not authenticated from the activation request receiving unit 31b, the management OS 31a causes one of the monitors 51a, 52a, and 53a to display the error message "Wrong user ID or password", for example. The one of the monitors 51a, 52a, and 53a belongs to the one of the input/output device sets 51, 52, and 53, which has transmitted the user ID and password. The management OS 31a then causes again the monitors to display the login screen illustrated in FIG. 7A. At this point, the device sorting unit 23 of the VMM 21 resumes the transfers of data from the other ones of the input/output device sets 51, 52, and 53 to the management OS 31a, which has been prohibited.

Receiving the notification indicating the user ID and password are authenticated from the activation request receiving unit 31b, the management OS 31a notifies the VM activating unit 31c of the obtained user ID and the information about the input/output device set 51, 52, or 53, which has transmitted the obtained user ID.

Receiving the authenticated user ID and the information about the input/output device set 51, 52, or 53 from the management OS 31*a*, the VM activating unit 31*c* reads the VM ID corresponding to the authenticated user ID from the VM information table 4*c*. The VM activating unit 31*c* then activates the guest OS VM corresponding to the VM ID read from the VM information table 4*c*. The VM activating unit 31*c* reads the corresponding guest OS program 40 from the HDD 4, and executes the guest OS program 40, to cause the corresponding one of the guest OSs 41*a*, 42*a*, and 43*a* to start operating.

At this point, the VMM 21 performs allocation of hardware to be used by the corresponding one of the guest OS VMs 41, 42, and 43, for example, and activates the corresponding one of the guest OS VMs 41, 42, and 43. The hardware to be allocated to the corresponding one of the guest OS VMs 41, 42, and 43 includes the CPU 1, the RAM 3, the HDD 4, and the input/output device set 51, 52, or 53, which is designated in the notification from the management OS 31*a*.

The various kinds of configuration information that are set in the corresponding guest OS VM 41, 42, or 43 by a user are loaded before the corresponding guest OS VM 41, 42, or 43 is activated. In this manner, the guest OS VM 41, 42, or 43, which is associated with the user, is activated. Hereinafter, the guest OS 41*a*, 42*a*, or 43*a* will be referred to simply as the guest OS 41*a*, the guest OS VM 41, 42, or 43 will be referred to simply as the guest OS VM 41, and the input/output device set 51, 52, or 53 will be referred to simply as the input/output device set 51.

When the guest OS VM 41 is activated, the VM activating unit 31*c* notifies the VMM 21 of the VM ID of the activated guest OS VM 41 and the input/output device ID of the input/output device set 51 allocated to the activated guest OS VM 41. The VM activating unit 31*c* also registers the VM ID of the activated guest OS VM 41 in the VM management table 4*f*. Here, the VM activating unit 31*c* stores "uncontrolled" as the control state information and "0" as the load fluctuation into the VM management table 4*f*.

In the VMM 21 having received the notification of the VM ID of the guest OS VM 41 and the input/output device ID of the input/output device set 51 allocated to the guest OS VM 41, the device allocating unit 22 associates the notified VM ID with the input/output device ID, and stores the VM ID and the input/output device ID into the VM-device correspondence table 4*e*.

The device sorting unit 23 transfers the output information from the guest OSs 41*a*, 42*a*, and 43*a* to the corresponding input/output device sets 51, 52, and 53, respectively, in accordance with the contents of the VM-device correspondence table 4*e*. More specifically, obtaining the output information from the guest OSs 41*a*, 42*a*, and 43*a*, the device sorting unit 23 identifies the VM IDs of the guest OS VMs 41, 42, and 43 corresponding to the guest OSs 41*a*, 42*a*, and 43*a*. The device sorting unit 23 then identifies the input/output device sets 51, 52, and 53 having the input/output device IDs associated with the identified VM IDs in the VM-device correspondence table 4*e*, and transfers the output information to the identified input/output device sets 51, 52, and 53.

The device sorting unit 23 also transfers the input information from the input/output device sets 51, 52, and 53 to the corresponding guest OS VMs 41, 42, and 43 (or the guest OSs 41*a*, 42*a*, and 43*a*), in accordance with the contents of the VM-device correspondence table 4*e*. In this manner, the input/output device sets 51, 52, and 53 can function as the direct I/Os (Input/Output) for the corresponding guest OSs 41*a*, 42*a*, and 43*a*.

Since the VM IDs of the activated guest OS VM 41 and the corresponding input/output device ID are included into the VM-device correspondence table 4*e* in the above manner, the usage environment of the guest OS VM 41 can be provided via the input/output device set 51. Accordingly, the user who has input the user ID and password can start using the guest OS VM 41, 42, or 43, which is allocated to the user, with the use of the corresponding input/output device 51, 52, or 53.

When the VM ID of the activated guest OS VM 41 and the input/output device ID are included into the VM-device correspondence table 4*e*, the device sorting unit 23 of the VMM 21 resumes the transfers of data from the other ones of the input/output device sets 51, 52, and 53 to the management OS 31*a*, which has been prohibited.

In the PC 10 of the first embodiment, the device sorting unit 23 of the VMM 21 conducts the data exchanges between the input/output device sets 51, 52, and 53, and the guest OSs 41*a*, 42*a*, and 43*a*. However, the input/output device sets 51, 52, and 53 may exchange data directly with the guest OSs 41*a*, 42*a*, and 43*a*, without the intervention of the VMM 21, for example.

Alternatively, the input/output device sets 51, 52, and 53 may exchange data with the guest OSs 41*a*, 42*a*, and 43*a*, not only via the VMM 21 but also via the management OS 31*a*. In such a case, the management OS 31*a* includes the functions of the device sorting unit 23. The management OS 31*a* obtains the output information from the guest OSs 41*a*, 42*a*, and 43*a* via the VMM 21, and transfers the output information to the corresponding input/output device sets 51, 52, and 53. The management OS 31*a* also obtains the input information from the input/output device sets 51, 52, and 53, and transfers the input information to the corresponding guest OSs 41*a*, 42*a*, and 43*a* via the VMM 21.

Figure 8A:
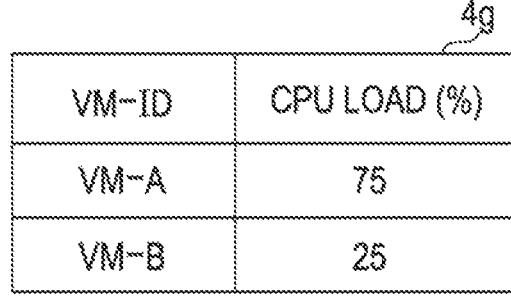
FIGS. 8A, 8B, and 8C illustrate the contents included in tables.
Figure 8B:
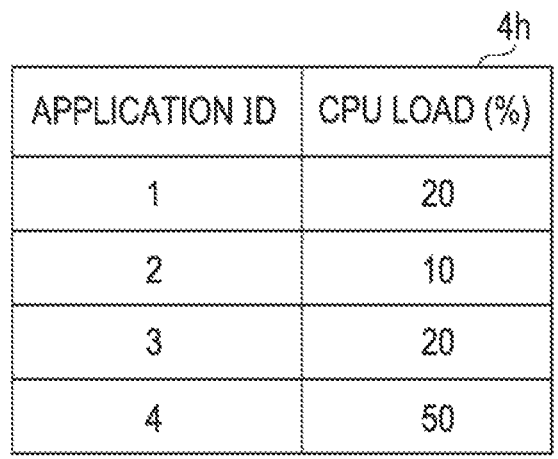
Figure 8C:
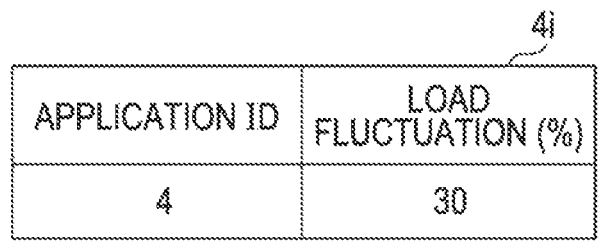

The loading state monitoring unit (the detecting unit) 24 of the VMM 21 monitors the processing load of each of the guest OS VMs 41, 42, and 43 after activation, and the monitored processing load is managed in the VM load table 4*g* illustrated in FIG. 8A. FIG. 8A, FIG. 8B, and FIG. 8C illustrate the contents included in tables. FIG. 8A illustrates the contents included in the VM load table 4*g*. FIG. 8B illustrates the contents included in the later-described execution process table 4*h*. FIG. 8C illustrates the contents included in the later-described control state management table 4*i*.

As illustrated in FIG. 8A, the VM load table 4*g* includes the VM IDs of the guest OS VMs 41, 42, and 43, and the CPU load of each of the guest OS VMs 41, 42, and 43. The VM IDs are associated with the CPU loads. The contents of the VM load table 4*g* are registered by the loading state monitoring unit 24, every time the management OS 31*a* activates one of the guest OS VMs 41, 42, and 43, for example. The contents of the VM load table 4*g* may also be updated by the loading state monitoring unit 24, every time the loading state monitoring unit 24 detects the processing load (the CPU load) on one of the guest OS VMs 41, 42, and 43. Further, the contents of the VM load table 4*g* are deleted by the loading state monitoring unit 24, every time one of the guest OS VMs 41, 42, and 43 stops operating, for example.

The VM load monitoring unit 31*d* of the management OS VM 31 obtains the CPU load of each of the guest OS VMs 41, 42, and 43 included in the VM load table 4*g*, from the loading state monitoring unit 24 of the VMM 21 on a regular basis (every 1 second, for example). The VM load monitoring unit 31*d* calculates the total amount of the obtained CPU loads of the respective guest OS VMs 41, 42, and 43, and notifies the VM load determining unit 31*e* of the calculated total amount and the CPU loads of the respective guest OS VMs 41, 42, and 43 obtained from the loading state monitoring unit 24 of the VMM 21.

The timing for the VM load monitoring unit 31*d* obtaining the CPU loads of the guest OS VMs 41, 42, and 43 (every 1 second, for example) is stored beforehand in the HDD 4 allocated to the management OS VM 31, for example. The timing may be changed by the manager of the PC 10 or the like.

The VM load determining unit (the determining unit) 31*e* determines whether the total amount of CPU load obtained from the VM load monitoring unit 31*d* is equal to or larger than a specific value (90%, for example). When determining that the total amount of CPU load is less than the specific value (90%, for example), the VM load determining unit 31*e* also determines that the PC 10 is not in a high-load state, and does not perform any process. The specific value compared with the total amount of CPU load is stored beforehand in the HDD 4 allocated to the management OS VM 31, for example. This specific value may also be changed by the manager of the PC 10 or the like.

When determining that the total amount of CPU load is equal to or larger than the specific value (90%, for example), the VM load determining unit 31*e* determines that the PC 10 is in a high-load state. Based on the CPU loads of the guest OS VMs 41, 42, and 43, the VM load determining unit (the designating unit) 31*e* designates one of the guest OS VMs 41, 42, and 43 having the largest CPU load, as the process-controlled object. The VM load determining unit 31*e* then notifies the VM notifying unit 31*f* of the designated one of the guest OS VMs 41, 42, and 43.

The VM notifying unit 31*f* sends a request for a processing load reduction (decrease) to the guest OS 41*a*, 42*a*, or 43*a* of the one of the guest OS VMs 41, 42, and 43 notified by the VM load determining unit 31*e*. At this point, the VM notifying unit 31*f* records the CPU load of the guest OS VM 41, 42, or 43, which receives the request for a processing load reduction, among the CPU loads of the guest OS VMs 41, 42, and 43 obtained by the VM load monitoring unit 31*d* from the VM load table 4*g*.

In the guest OS VM 41, the guest OS 41*a* starts monitoring the processing load (the CPU load) of each application program 50 at a start of execution of the application programs 50 stored in the HDD 4. The guest OS 41*a* manages the monitored processing load of each application program 50 in the execution process table 4*h* illustrated in FIG. 8B.

As illustrated in FIG. 8B, the execution process table 4*h* includes the application ID of the application program 50 being executed by the guest OS 41*a*, and the processing load (the CPU load) of each application program 50. The application ID and the processing load are associated with each other. The contents of the execution process table 4*h* are registered by the guest OS 41*a*, every time the guest OS 41*a* executes the application program 50, for example. The contents of the execution process table 4*h* may also be updated by the guest OS 41*a*, every time the processing load of the application program 50 being executed by the guest OS 41*a* is detected. Further, the contents of the execution process table 4*h* are deleted by the guest OS 41*a*, every time the guest OS 41*a* finishes executing the application program 50, for example.

When a request for a processing load reduction is sent from the VM notifying unit 31*f* of the management OS VM 31, the guest OS 41*a* notifies the load analyzing unit 41*b* of the request. Upon receipt of the notification of the request for a processing load reduction, the load analyzing unit (the process identifying unit) 41*b* identifies the application program 50 having the largest CPU load among the application programs 50 being executed, based on the contents of the execution process table 4*h*. According to the execution process table 4*h* illustrated in FIG. 8B, the application program 50 having the application ID "4" is designated as the application program 50 having the largest CPU load.

The load analyzing unit 41*b* notifies the control method designating unit 41*c* of the application ID of the identified application program 50. Upon receipt of the notification of the application ID, the control method designating unit 41*c* obtains the control method for reducing the processing load of the application program 50 identified by the load analyzing unit 41*b*, based on the contents of the control method table 4*d*. In this example, the control method designating unit 41*c* obtains "suspend" as the control method for the application program 50 having the application ID "4". The control method designating unit 41*c* notifies the control unit 41*d* of the obtained control method and the application ID sent from the load analyzing unit 41*b*.

Receiving the notification of the application ID and the control method from the control method designating unit 41*c*, the control unit 41*d* starts performing an operation to control the execution state of the application program 50 having the application ID by the designated control method. In this example, the control unit 41*d* causes the corresponding monitor 51*a*, 52*a*, or 53*a* to display the notification screen illustrated in FIG. 7B, and notifies the user that the control on the execution of the application program 50 (execution restriction) is to be started.

The notification screen illustrated in FIG. 7B notifies the user that the operation according to the application program 50 being currently executed is to be suspended, since the processing load of the guest OS VM 41 in use is too large. Accordingly, the user can recognize that the control (a restriction) on the execution of the application program 50 is to be started before it is actually started.

After starting the control on the execution of the application program 50, the control unit 41*d* detects the processing load (the CPU load) of the application program 50, and calculates the load fluctuation from the processing load included in the execution process table 4*h*. The control unit 41*d* stores the calculated load fluctuation into the control state management table 4*i* illustrated in FIG. 8C. By doing so, the control unit 41*d* can use the control state management table 4*i* to manage the processing load (the load fluctuation) reduced by controlling the execution state of the application program 50.

As illustrated in FIG. 8C, the control state management table 4*i* includes the application ID of the application program 50 having its process state controlled by the control unit 41*d*, and the load fluctuation reduced by controlling the execution state. The application ID and the load fluctuation are associated with each other. The contents of the control state management table 4*i* are registered by the control unit 41*d*, every time the control unit 41*d* starts controlling the execution of the application program 50, for example. The contents of the control state management table 4*i* are also deleted by the control unit 41*d*, every time the control unit 41*d* finishes the execution control on the application program 50, for example.

When the execution control on the application program 50 is started, the control unit 41*d* notifies the VM notifying unit 31*f* of the management OS VM 31 that the execution control on the application program 50 has been started. Upon receipt of the notification of the start of the execution control on the application program 50, the VM notifying unit 31*f* updates the information included with respect to the guest OS VM 41, 42, or 43, which has sent the notification, in the VM management table 4*f*. More specifically, the VM notifying unit 31*f* updates the control state information about the guest OS VM 41, 42, or 43, which has sent the notification, to "controlled".

The VM notifying unit 31f also calculates the difference between the CPU load that is stored when the request for a processing load reduction is sent to the guest OS VM 41, 42, or 43, and the CPU load of the guest OS VM 41, 42, or 43 newly obtained by the VM load monitoring unit 31d from the VM load table 4g. The VM notifying unit 31f adds the calculated difference to the load fluctuation of the guest OS VM 41, 42, or 43 included in the VM load table 4g and updates the value. In this manner, the management OS VM 31 can determine whether there is an application program 50 having execution control performed thereon in one of the guest OS VMs 41, 42, and 43. If there is an application program 50 having execution control performed thereon, the management OS VM 31 can recognize the processing load reduced by controlling the execution state.

In the PC 10 in which the execution state of the application program 50 being executed in one of the guest OS VMs 41, 42, and 43 is controlled as described above, the VM load determining unit 31e of the management OS VM 31 monitors whether the execution control on any of the application programs 50 can be cancelled. More specifically, the VM load determining unit 31e determines whether the execution control on any of the application programs 50 can be cancelled, based on the total amount of the CPU loads of the guest OS VMs 41, 42, and 43 obtained from the VM load monitoring unit 31d on a regular basis (every 1 second, for example) and the contents of the VM management table 4f.

The VM load determining unit 31e first determines which one of the guest OS VMs 41, 42, and 43 has the smallest load fluctuation, based on the load fluctuations included in the VM load table 4f. The VM load determining unit 31e determines whether the value obtained by adding the smallest load fluctuation to the total amount of the CPU loads of the guest OS VMs 41, 42, and 43 obtained from the VM load monitoring unit 31d is equal to or larger than a specific value (90%, for example). When determining that the value obtained through the addition is equal to or larger than the specific value, the VM load determining unit 31e determines that the PC 10 is put into a high-load state if the execution control is cancelled, and therefore, does not perform any operation.

When determining that the value obtained through the addition is smaller than the specific value, the VM load determining unit 31e determines that the PC 10 is not put into a high-load state even if the execution control is cancelled. The VM load determining unit 31e then notifies the VM notifying unit 31f that the guest OS VM 41, 42, or 43, which has the smallest load fluctuation, has the process control to be cancelled.

The VM notifying unit 31f then sends a request for cancellation of process control to the guest OS 41a, 42a, or 43a of the guest OS VM 41, 42, or 43 designated as the process control cancelled object by the VM load determining unit 31e. Here, the VM notifying unit 31f records the CPU load of the guest OS VM 41, 42, or 43 having the process control to be cancelled, among the CPU loads of the guest OS VMs 41, 42, and 43 obtained by the VM load monitoring unit 31d from the VM load table 4g.

Receiving the request for cancellation of the process control from the VM notifying unit 31f of the management OS VM 31, the guest OS 41a notifies the load analyzing unit 41b of the request. Upon receipt of the notification of the process control cancel request, the load analyzing unit 41b identifies the application program 50 having the smallest load fluctuation among the application programs 50 having execution control performed thereon, based on the contents of the control state management table 4i.

The load analyzing unit 41b notifies the control method designating unit 41c that the application ID of the identified application program 50 is designated as the execution control cancellation object. Upon receipt of the notification of the application ID as the execution control cancellation object, the control method designating unit 41c obtains the control method corresponding to the application program 50 identified by the load analyzing unit 41b, based on the contents of the control method table 4d. The control method designating unit 41c then notifies the control unit 41d of the obtained control method and the application ID designated as the execution control cancellation object by the load analyzing unit 41b.

Upon receipt of the notification of the application ID as the execution control cancellation object and the control method from the control method designating unit 41c, the control unit 41d cancels the execution control performed on the application program 50 having the application ID by the designated control method. Here, the control unit 41d causes the corresponding monitor 51a, 52a, or 53a to display the notification screen illustrated in FIG. 7C, and notifies the user that the control on the execution of the application program 50 is to be cancelled.

The notification screen illustrated in FIG. 7C notifies the user that the operation according to the application program 50 currently having the execution control (restriction) performed thereon is to be resumed, since the execution is again allowed. Accordingly, the user can recognize that the operation according to the application program 50 is to be resumed before it is actually resumed.

After cancelling the control on the execution of the application program 50, the control unit 41d deletes the information about the application program 50 having the execution control cancelled, from the control state management table 4i.

When the control on the execution of the application program 50 is cancelled, the control unit 41d also notifies the VM notifying unit 31f of the management OS VM 31 that the control on the execution of the application program 50 has been cancelled. Upon receipt of the notification of the cancellation of the control on the execution of the application program 50, the VM notifying unit 31f updates the information about the guest OS VM 41, 42, or 43, which has sent the notification, in the VM management table 4f.

The VM notifying unit 31f first calculates the processing load (the load fluctuation) increased by canceling the control on the execution of the application program 50 in the guest OS VM 41, 42, or 43. More specifically, the VM notifying unit 31f calculates the difference (the increased load fluctuation) between the CPU load that is recorded when the process control cancel request is sent to the guest OS VM 41, 42, or 43, and the CPU load of the guest OS VM 41, 42, or 43 newly obtained by the VM load monitoring unit 31d from the VM load table 4g. The VM notifying unit 31f then updates the VM management table 4f by subtracting the calculated difference from the load fluctuation of the guest OS VM 41, 42, or 43 included in the VM management table 4f.

If the updated load fluctuation of the guest OS VM 41, 42, or 43 is zero, the VM notifying unit 31f updates the control state information about the guest OS VM 41, 42, or 43 to "uncontrolled" in the VM management table 4f.

In this manner, the management OS VM 31 can recognize the processing loads of the guest OS VMs 41, 42, and 43 that are increased and reduced by controlling the execution states of the application programs 50 and cancelling the control on the execution status of the application programs 50. For example, the processing loads may be recognizable in real time.

As described above, when the processing load of one of the guest OS VMs 41, 42, and 43 in process becomes large, the PC 10 of the first embodiment controls the operation according to the application program 50 being executed by one of the guest OS VMs 41, 42, and 43. In this manner, the processing load on the entire PC 10 can be reduced, and the operability of each of the guest OS VMs 41, 42, and 43 can be secured.

Referring now to a flowchart, the process to be performed when the management OS VM 31 activates the guest OS VMs 41, 42, and 43 in the PC 10 of the first embodiment is described. FIG. 9 is the processing performed by the management OS VM 31 to activate the guest OS VMs 41, 42, and 43. The following procedures are performed by the management OS VM 31 and the VMM 21 in accordance with a control program stored in the ROM 2 or the HDD 4 of the PC 10. In FIG. 9, the left-side one of the two regions partitioned by a broken line depicts the procedures to be carried out by the management OS VM 31, and the right-side region depicts the procedures to be carried out by the VMM 21.

After the PC 10 is switched on, and the hardware components of the PC 10 are activated, the CPU 1 executes the VMM program 20, to activate the VMM 21. The VMM 21 executes the management OS program 30, to activate the management OS VM 31.

The management OS VM 31 causes all the monitors 51a, 52a, and 53a to display the login screen illustrated in FIG. 7A. The management OS VM 31 determines whether user information including a user ID and a password has been obtained from one of the input/output device sets 51, 52, and 53 (S1). If the management OS VM 31 determines that user information has not been obtained from any of the input/output device sets 51, 52, and 53 (S1: NO), the management OS VM 31 stands by, while performing other procedures.

If the management OS VM 31 determines that user information has been obtained from one of the input/output device sets 51, 52, and 53 (S1: YES), the management OS VM 31 identifies the one of the input/output device sets 51, 52, and 53, which has transmitted the user information (S2). Here, the management OS VM 31 prohibits acquisition of data from the other ones of the input/output device sets 51, 52, and 53. The management OS VM 31 performs authentication on the obtained user information, based on the contents of the user information table 4b, and determines whether the obtained user information is authenticated (S3).

If the management OS VM 31 determines that the user information is not authenticated (S3: NO), the management OS VM 31 causes the monitor 51a, 52a, or 53a of the input/output device set 51, 52, or 53, which has transmitted the user information, to display the error notification screen for notifying that the user information is not authenticated (S4). The management OS VM 31 then causes the monitors to display the login screen illustrated in FIG. 7A, and returns to the procedure of step S1. Here, the management OS VM 31 resumes the acquisition of data from the other ones of the input/output device sets 51, 52, and 53 having data acquisition prohibited.

If the management OS VM 31 determines that the user information is authenticated (S3: YES), the management OS VM 31 reads the VM ID corresponding to the obtained user ID from the VM information table 4c (S5). The management OS VM 31 also causes the VMM 21 to allocate the hardware to be used by the guest OS VM 41, 42, or 43, and activates one of the guest OS VMs 41, 42, and 43 (S6). Here, the management OS VM 31 activates the guest OS VM corresponding to the read VM ID. The management OS VM 31 then reads the corresponding guest OS program 40 from the HDD 4, and executes the guest OS program 40, to cause the corresponding one of the guest OSs 41a, 42a, and 43a to start operating.

The management OS VM 31 notifies the VMM 21 of the correspondence between the VM ID of the activated one of the guest OS VMs 41, 42, and 43 and the input/output device ID of the input/output device set 51, 52, or 53 allocated to the activated one of the guest OS VMs 41, 42, and 43 (S7). The management OS VM 31 registers the VM ID of the activated guest OS VM 41 in the VM management table 4f (S8). Here, the management OS VM 31 stores "uncontrolled" as the control state information and "0" as the load fluctuation into the VM management table 4f.

The VMM 21 associates the notified VM ID with the input/output device ID, and stores the VM ID and the input/output device ID into the VM-device correspondence table 4e (S9). The process then comes to an end.

Through this process, data exchange is started between the guest OS VM 41, 42, or 43 activated at step S6 and the input/output device set 51, 52, or 53 corresponding to the activated one of the guest OS VMs 41, 42, and 43. Accordingly, the user who has input the user information with the use of the corresponding one of the input/output device sets 51, 52, and 53 can exclusively use the corresponding one of the guest OS VMs 41, 42, and 43. The management OS VM 31 returns to the procedure of step S1, and resumes data acquisition from the other ones of the input/output device sets 51, 52, and 53 having data acquisition prohibited.

Figure 10:
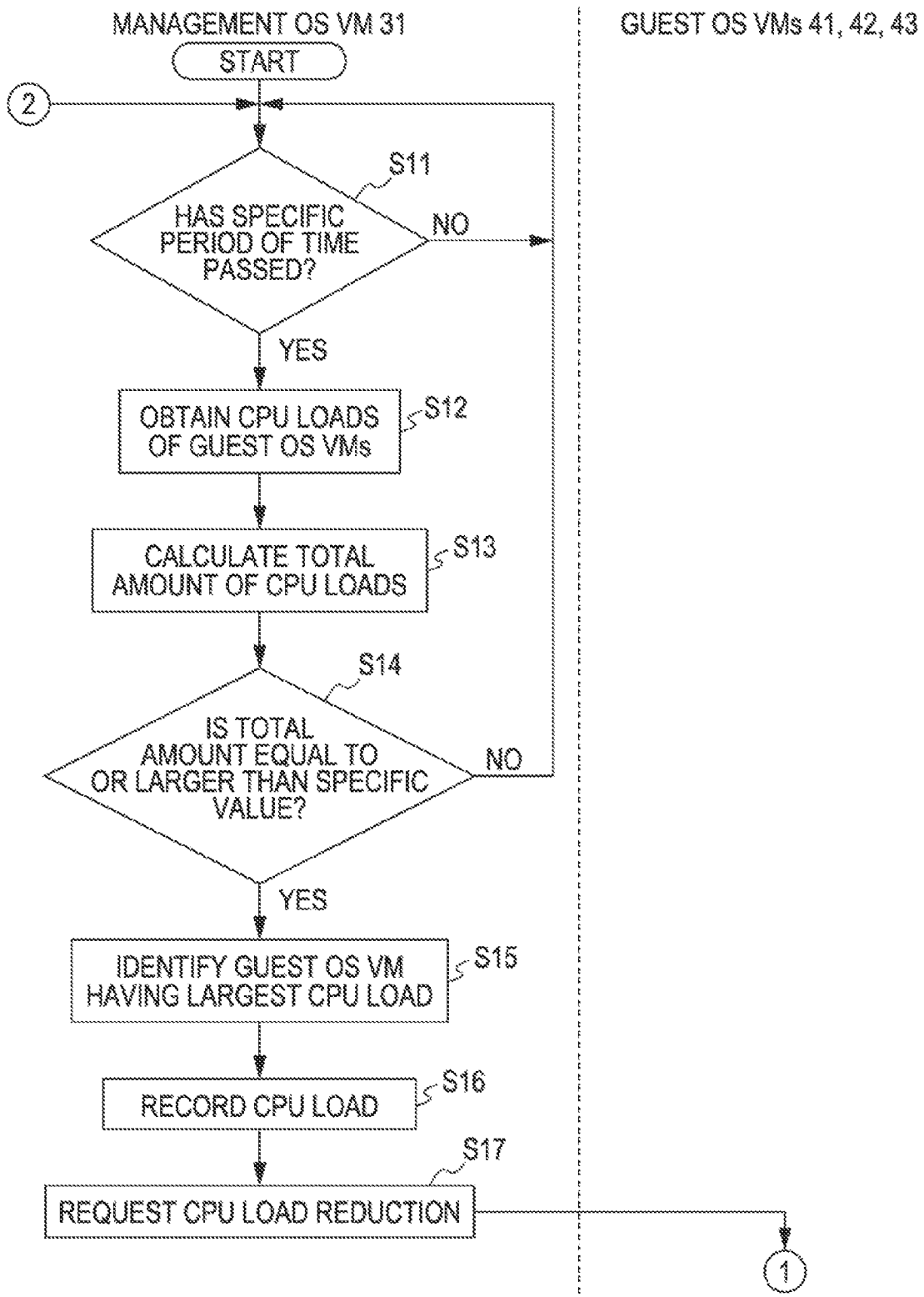
FIG. 10 illustrates a flowchart of a load control operation according to the first embodiment.
Figure 11:
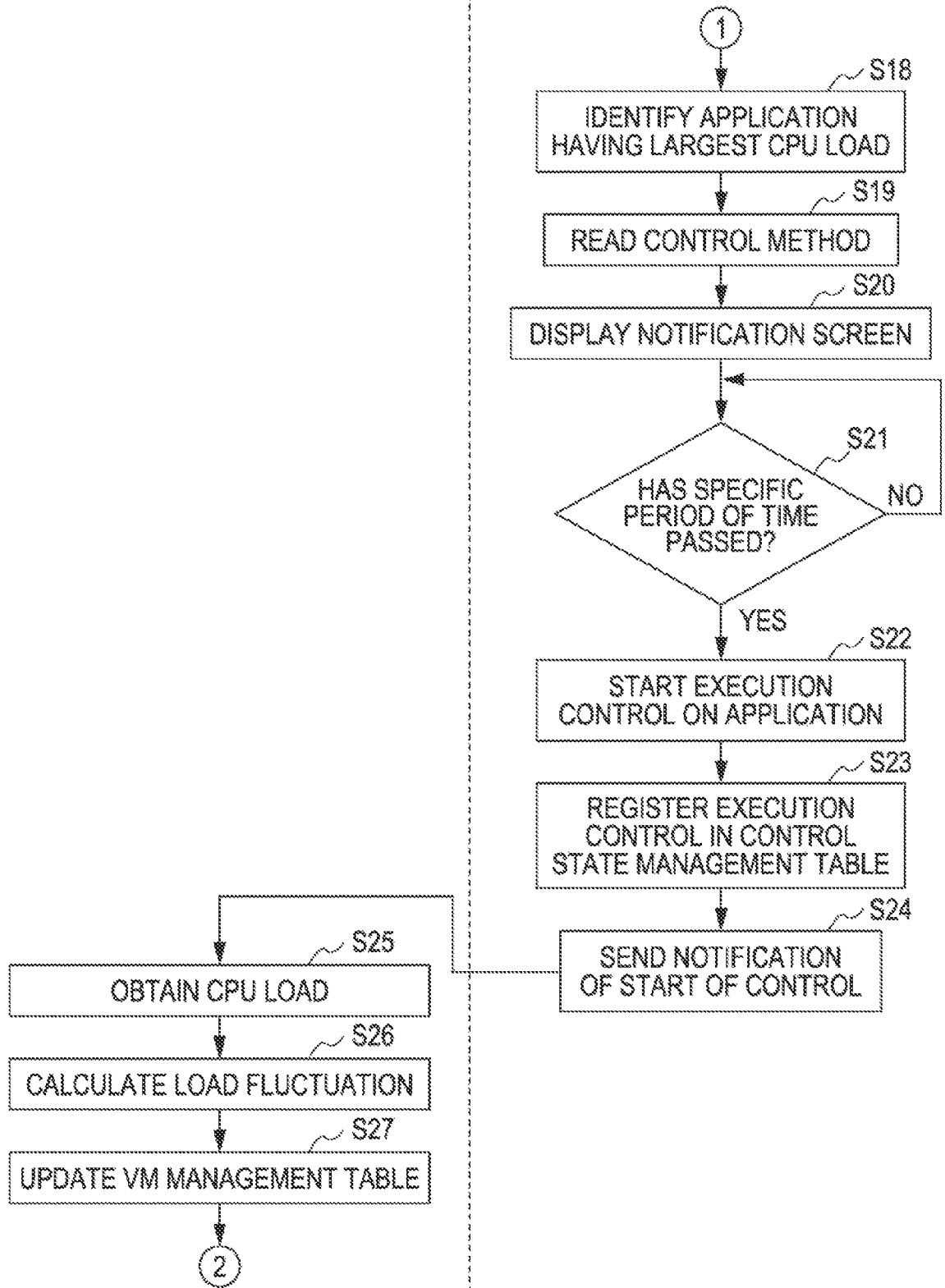
FIG. 11 illustrates a flowchart of the load control operation according to the first embodiment.

Referring now to another flowchart, the process to be performed by the management OS VM 31 when the processing load of the guest OS VMs 41, 42, and 43 becomes large in the PC 10 of the first embodiment is described. FIG. 10 and FIG. 11 are the flowcharts of a load control process of the first embodiment. The following procedures are to be performed by the management OS VM 31 and the guest OS VMs 41, 42, and 43 in accordance with a control program stored in the ROM 2 or the HDD 4 of the PC 10. In FIG. 10 and FIG. 11, the left-side one of the two regions partitioned by a broken line depicts the procedures to be carried out by the management OS VM 31, and the right-side region depicts the procedures to be carried out by the guest OS VMs 41, 42, and 43.

The management OS VM 31 clocks a specific period of time, and determines whether the specific period of time (one second, for example) has passed (S11). If the management OS VM 31 determines that the specific period of time has not passed (S11: NO), the management OS VM 31 stands by, while performing other procedures. If the management OS VM 31 determines that the specific period of time has passed (S11: YES), the management OS VM 31 obtains the CPU loads of the respective guest OS VMs 41, 42, and 43 from the VM load table 4g that is updated by the VMM 21 (S12). The management OS VM 31 calculates the total amount of the obtained CPU loads of the guest OS VMs 41, 42, and 43 (S13), and determines whether the calculated total amount is equal to or larger than the specific value (90%, for example) (S14).

If the management OS VM 31 determines that the total amount of the CPU loads is smaller than the specific value (S14: NO), the management OS VM 31 returns to the procedure of step S11. If the management OS VM 31 determines that the total amount of the CPU loads is equal to or larger than the specific value (S14: YES), the management OS VM 31 determines which one of the guest OS VMs 41, 42, and 43 has the largest CPU load, based on the CPU loads obtained at step S12 (S15). The management OS VM 31 records the CPU load of the identified one of the guest OS VMs 41, 42, and 43

(S16), and requests the identified one of the guest OS VMs 41, 42, and 43 to reduce the CPU load (S17).

Upon receipt of the request for a CPU load reduction, one of the guest OS VMs 41, 42, and 43 identifies the application program 50 having the largest CPU load among the application programs 50 being executed, based on the contents of the execution process table 4h (S18). The guest OS VM 41 reads the control method for reducing the CPU load of the identified application program 50, from the control method table 4d (S19).

The guest OS VM 41 causes the corresponding one of the monitors 51a, 52a, and 53a to display the notification screen for notifying the user that the execution states of the application programs 50 being currently executed are to be controlled (S20). The guest OS VM 41 then determines whether a specific period of time (five seconds, for example) allowed before the execution control is started on the application program 50 designated in the notification screen has passed (S21). If the guest OS VM 41 determines that the specific period of time has not passed (S21: NO), the guest OS VM 41 stands by until the specific period of time elapses.

The specific period of time (five seconds, for example) allowed before the execution control is started on the application program 50 is stored beforehand in the HDD 4 allocated to the guest OS VM 41, for example. The specific value can be changed by the manager of the PC 10 or the user of the guest OS VM 41, for example.

If the guest OS VM 41 determines that the specific period of time has passed (S21: YES), the guest OS VM 41 starts the execution control on the application program 50 identified at step S18, by the control method read out from the control method table 4d (S22). After starting the execution control on the application program 50, the guest OS VM 41 detects the CPU load of this application program 50, and calculates the load fluctuation from the processing load included in the execution process table 4h. The guest OS VM 41 then registers the calculated load fluctuation in the control state management table 4i (S23).

The guest OS VM 41 notifies the management OS VM 31 that the execution control on the application program 50 has been started (S24). Upon receipt of the notification of the start of the control on the application program 50, the management OS VM 31 newly obtains the CPU load of the guest OS VM 41 from the VM load table 4g (S25). The management OS VM 31 calculates the load fluctuation of the guest OS VM 41 reduced by controlling the execution state of the application program 50 (S26). More specifically, the management OS VM 31 calculates the difference between the CPU load of the guest OS VM 41 obtained at step S25 and the CPU load recorded at step S16.

The management OS VM 31 updates the control state information included in the VM management table 4f with respect to the guest OS VM 41, to "controlled". The management OS VM 31 updates the VM management table 4f by adding the calculated load fluctuation to the load fluctuation of the guest OS VM 41 (S27). The management OS VM 31 then returns to the procedure of step S11.

Through the above process, the management OS VM 31 can use the VM management table 4f to manage the processing loads of the guest OS VMs 41, 42, and 43, which are reduced by controlling the execution states of the application programs 50.

Figure 12:
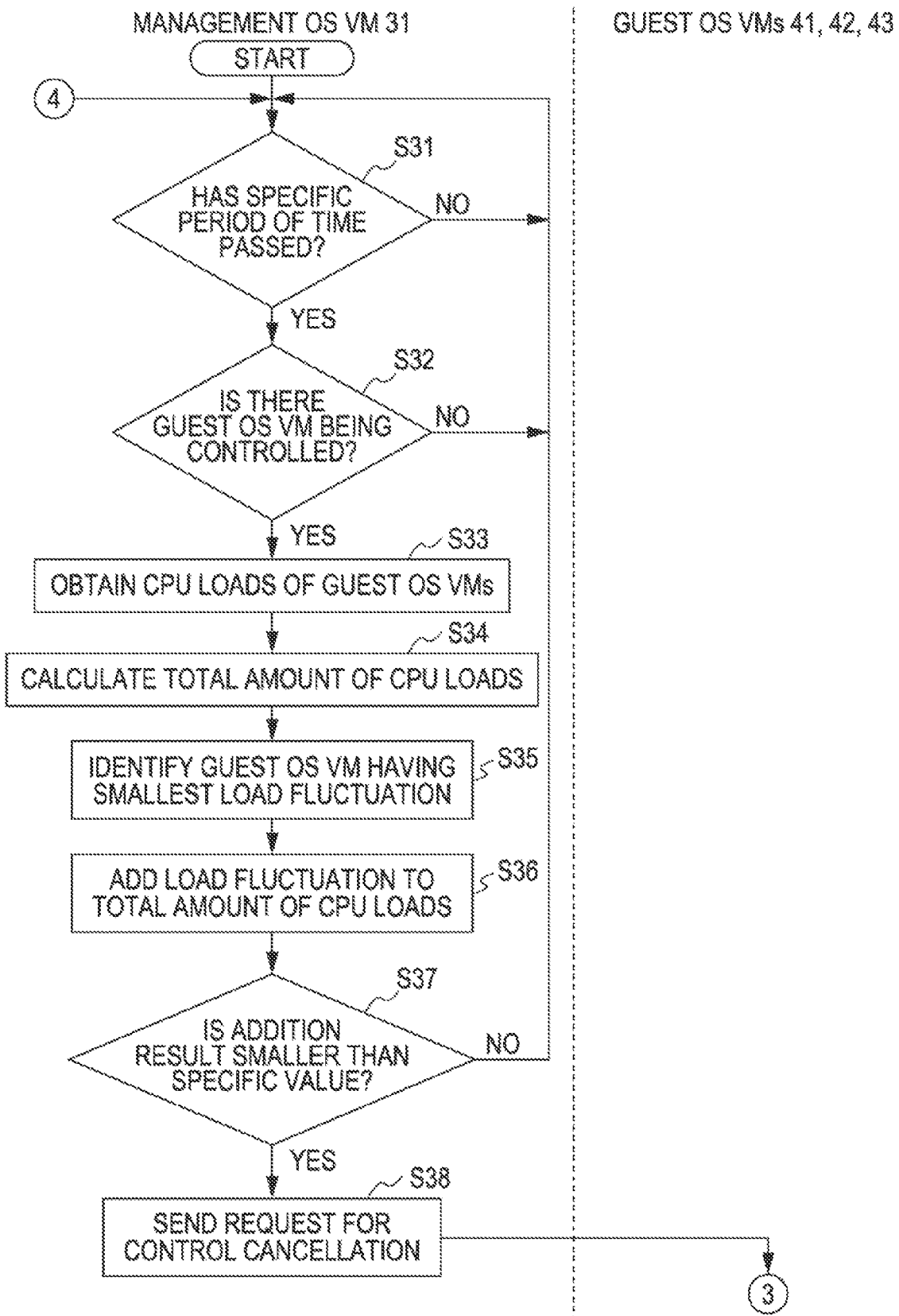
FIG. 12 illustrates a flowchart of a load monitoring operation according to the first embodiment.
Figure 13:
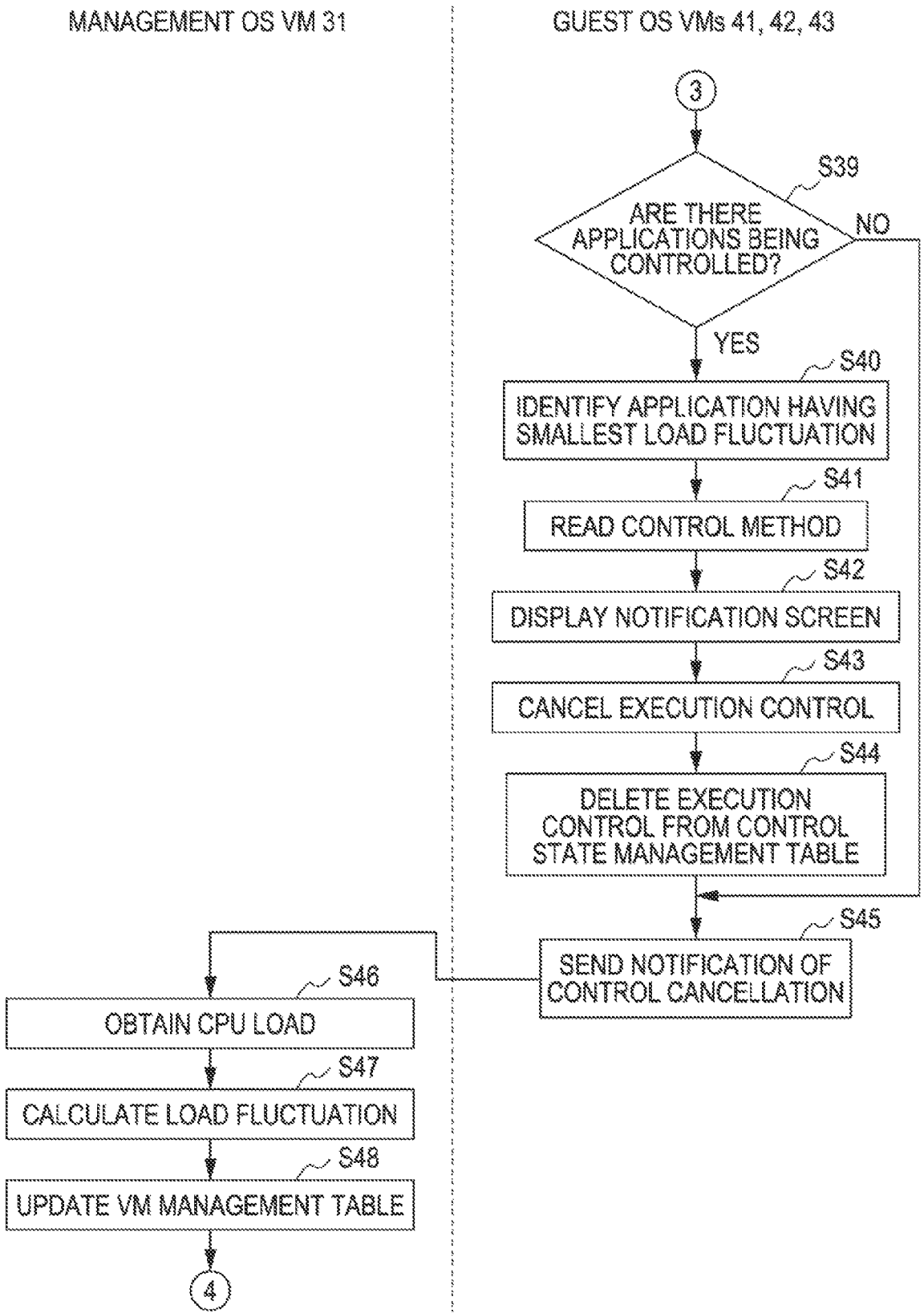
FIG. 13 illustrates a flowchart of the load monitoring operation according to the first embodiment.

Referring now to another flowchart, the following is a description of the process to be performed by the management OS VM 31 to monitor the processing loads of the guest OS VMs 41, 42, and 43 in the PC 10 in which the execution states of the application programs 50 being executed by one of the guest OS VMs 41, 42, and 43 are controlled as described above. FIG. 12 and FIG. 13 are the flowcharts of the load monitoring process of the first embodiment.

The following procedures are performed by the management OS VM 31 and the guest OS VMs 41, 42, and 43 in accordance with a control program stored in the ROM 2 or the HDD 4 of the PC 10. In FIGS. 12 and 13, the left-side one of the two regions partitioned by a broken line depicts the procedures to be carried out by the management OS VM 31, and the right-side region depicts the procedures to be carried out by the guest OS VMs 41, 42, and 43.

The management OS VM 31 clocks a specific period of time, and determines whether the specific period of time (one second, for example) has passed (S31). If the management OS VM 31 determines that the specific period of time has not passed (S31: NO), the management OS VM 31 stands by, while performing other procedures. If the management OS VM 31 determines that the specific period of time has passed (S31: YES), the management OS VM 31 determines whether any one of the guest OS VMs 41, 42, and 43 has the execution of the corresponding application program 50 controlled, based on the contents of the VM management table 4f (S32). If the management OS VM 31 determines that none of the guest OS VMs 41, 42, and 43 has the execution of the application program 50 controlled (S32: NO), the management OS VM 31 returns to the procedure of step S31.

If the management OS VM 31 determines that one of the guest OS VMs 41, 42, and 43 has the execution of the application program 50 controlled (S32: YES), the management OS VM 31 obtains the CPU loads of the respective guest OS VMs 41, 42, and 43 included in the VM load table 4g that is updated by the VMM 21 (S33). The management OS VM 31 calculates the total amount of the obtained CPU loads of the guest OSs VM 41, 42, and 43 (S34).

Based on the load fluctuations included in the VM management table 4f, the management OS VM 31 determines which one of the guest OS VMs 41, 42, and 43 has the smallest load fluctuation (S35). The management OS VM 31 calculates a total value by adding the total amount of the CPU loads calculated at step S34 to the load fluctuation of the guest OS VM 41, 42, or 43, which has been identified at step S35 (S36). The management OS VM 31 determines whether the calculated total value is smaller than a specific value (90%, for example) (S37).

If the management OS VM 31 determines that the calculated total value is equal to or larger than the specific value (S37: NO), the management OS VM 31 returns to the procedure of step S31. If the management OS VM 31 determines that the calculated total value is smaller than the specific value (S37: YES), the management OS VM 31 issues a control cancel request to the guest OS VM 41, 42, or 43, which has been identified at step S35 (S38). Here, the management OS VM 31 records the CPU loads of the guest OS VM 41, 42, or 43, to which the control cancel request is issued.

Upon receipt of the control cancel request, the guest OS VMs 41, 42, and 43 determines whether there are application programs 50 having their execution states controlled, based on the contents of the execution process table 4h (S39). If the guest OS VM 41 determines that there is not an application program 50 having its execution state controlled (S39: NO), the guest OS VM 41 moves on to the procedure of step S45. If the guest OS VM 41 determines that there are application programs 50 having their execution states controlled (S39: YES), the guest OS VM 41 identifies the application program 50 having the smallest load fluctuation among the application programs 50 having their execution states controlled (S40).

The guest OS VM 41 reads the control method corresponding to the identified application program 50 from the control method table 4d (S41). The guest OS VM 41 causes the corresponding one of the monitors 51a, 52a, and 53a to display the notification screen for notifying the user that the execution of the application program 50 being currently controlled is to be resumed (S42). The guest OS VM 41 cancels the execution control on the application program 50 identified at step S40, by the control method read from the control method table 4d (S43). In this manner, the execution of the application program 50 identified at step S40 is resumed.

After resuming the execution of the application program 50, the guest OS VM 41 deletes the information about the resumed application program 50 from the control state management table 4i (S44). The guest OS VM 41 notifies the management OS VM 31 that the execution control on the application program 50 has been cancelled (S45).

Upon receipt of the notification of the cancellation of the control on the application program 50, the management OS VM 31 newly obtains the CPU load of the guest OS VM 41 from the VM load table 4g (S46). The management OS VM 31 calculates the load fluctuation increased by the cancellation of the execution control on the application program 50 of the guest OS VM 41 (S47). More specifically, the management OS VM 31 calculates the difference between the CPU load of the guest OS VM 41 obtained at step S46 and the CPU load recorded when the control cancel request is sent to the guest OS VM 41.

The management OS VM 31 then updates the VM management table 4f by subtracting the calculated load fluctuation from the load fluctuation of the guest OS VM 41 included in the VM management table 4f (S48). If the updated load fluctuation becomes zero at this point, the management OS VM 31 updates the control state information about the guest OS VM 41 to "uncontrolled" in the VM management table 4f. The management OS VM 31 then returns to step S31.

In this manner, the management OS VM 31 can recognize the processing loads of the guest OS VMs 41, 42, and 43 that are varied by cancelling the execution control on the application programs 50. For example, the processing loads may be recognizable in real time.

Figure 14:
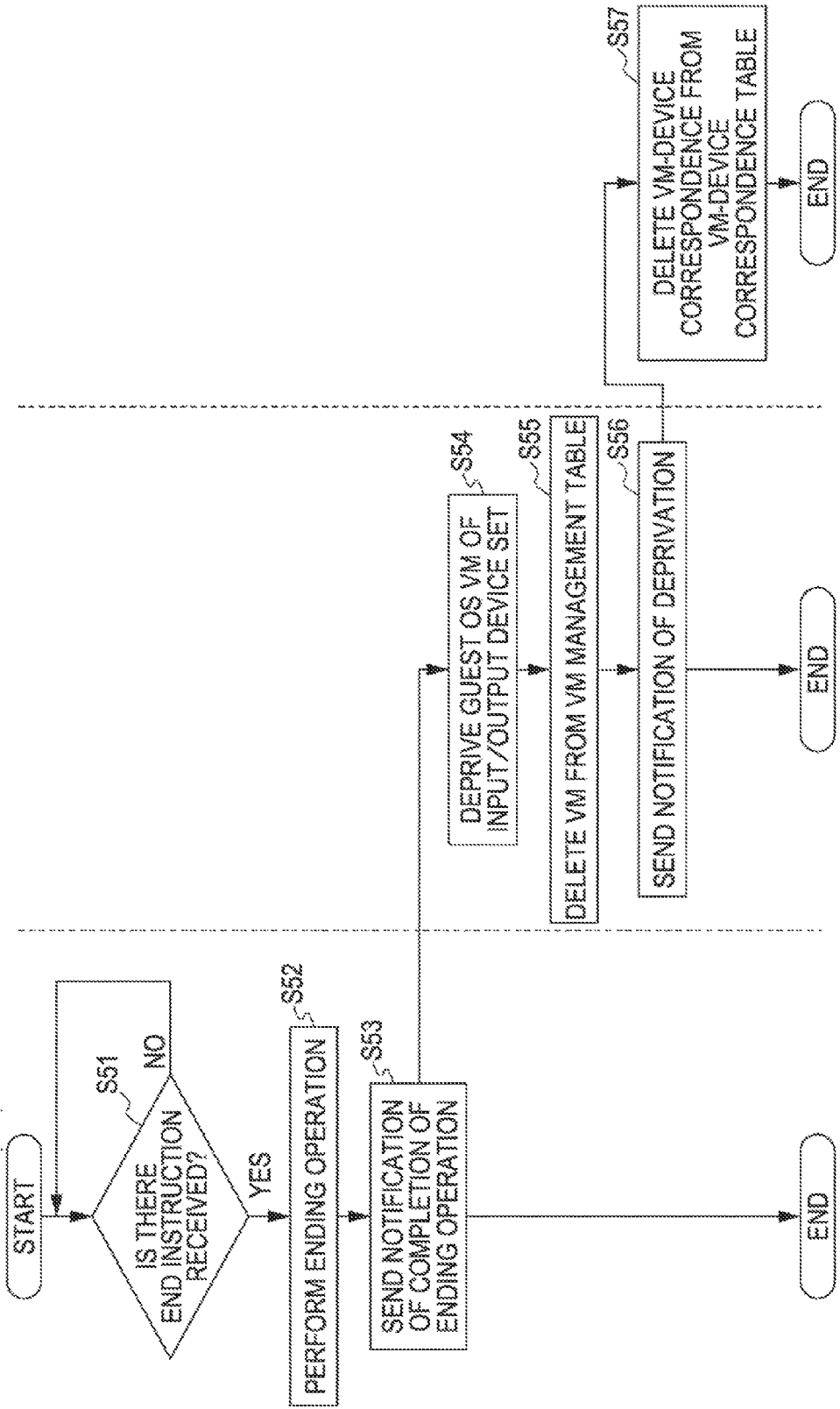
FIG. 14 illustrates a flowchart of the processing to be performed to terminate a guest OS VM.

Referring now to another flowchart, the operation to be performed to end the processes of the guest OS VMs 41, 42, and 43 is described. FIG. 14 is the flowchart of the processing to be performed to terminate the guest OS VMs 41, 42, and 43. The following procedures are to be performed by the guest OS VMs 41, 42, and 43, the management OS VM 31, and the VMM 21 in accordance with a control program stored in the ROM 2 or the HDD 4 of the PC 10. In FIG. 14, the left-side one of the three regions partitioned by broken lines depicts the procedures to be carried out by the guest OS VMs 41, 42, and 43. The center region depicts the procedures to be carried out by the management OS VM 31, and the right-side region depicts the procedures to be carried out by the VMM 21.

Each of the guest OS VMs 41, 42, and 43 determines whether an end instruction has been received via the corresponding one of the input/output device sets 51, 52, and 53 (S51). If the guest OS VM 41, 42, or 43 determines that there is not an end instruction received (S51: NO), the guest OS VM 41, 42, or 43 stands by, while performing other procedures. If the guest OS VM 41, 42, or 43 determines that there is an end instruction received (S51: YES), the guest OS VM 41, 42, or 43 performs the ending operation (S52). When the ending operation is completed, the guest OS VM 41, 42, or 43 notifies the management OS VM 31 of the completion of the ending operation (S53), and finishes its process.

Upon receipt of the notification of the completion of the ending operation, the management OS VM 31 deprives the guest OS VM 41, 42, or 43, which has sent the notification of the completion of the ending operation, of the allocated one of the input/output device sets 51, 52, and 53 (S54). The management OS VM 31 deletes the information about the subject guest OS VM 41, 42, or 43, from the VM management table 4f (S55). The management OS VM 31 then notifies the VMM 21 that the corresponding input/output device set 51, 52, or 53 detached from the subject guest OS VM 41, 42, or 43 (S56), and finishes its process.

The VMM 21 deletes the VM ID of the guest OS VM 41, 42, or 43 designated in the notification, and the input/output device ID of the input/output device set 51, 52, or 53 detached from the guest OS VM 41, 42, or 43, from the VM-device correspondence table 4e (S57). The VMM 21 then finishes its process. Thereafter, the input/output device set 51, 52, or 53 detached from the subject guest OS VM 41, 42, or 43 is associated with the management OS 31a.

As described above, in the first embodiment, the execution of high-load application programs 50 being executed by the high-load one of the guest OS VMs 41, 42, and 43 is restricted, so as to reduce the processing load of the high-load one of the guest OS VMs 41, 42, and 43. Accordingly, the processing load of the entire PC 10 can be reduced, without influence on the other ones of the guest OS VMs 41, 42, and 43. In this manner, limited resources can be evenly allocated to the guest OS VMs 41, 42, and 43, while the requirements for the guest OS VMs 41, 42, and 43 are satisfied. Thus, high-quality guest OS VMs 41, 42, and 43 can be provided to users.

In the first embodiment, the three guest OS VMs 41, 42, and 43 are constructed in one PC 10, so that three users can share the PC 10. However, the information processing devices disclosed in the embodiments are not limited to that configuration. The number of guest OS VMs to be constructed can be varied in accordance with the number of USB ports 5a and the number of monitor connecting ports 6a provided on the PC 10.

When the total amount of the CPU loads of the guest OS VMs 41, 42, and 43 is equal to or larger than the specific value, the PC 10 of the first embodiment reduces the largest CPU load among the guest OS VMs 41, 42, and 43. However, to reduce the CPU load of the entire PC 10, the CPU load of any one of the guest OS VMs 41, 42, and 43 may be reduced, instead of the largest CPU load among the guest OS VMs 41, 42, and 43.

To reduce the CPU load of the guest OS VM 41, 42, or 43, the PC 10 of the first embodiment controls the execution state of the application program 50 having the largest CPU load. However, instead of the execution state of the application program 50 having the largest CPU load, the execution state of any application program 50 may be controlled, as long as the CPU load of each of the guest OS VMs 41, 42, and 43 is reduced.

In the first embodiment, the management OS VM 31 designates one of the guest OS VMs 41, 42, and 43 as the guest OS VM having its processing load to be reduced, and the designated one of the guest OS VMs 41, 42, and 43 designates the application program 50 having its execution state to be controlled. However, the embodiments are not limited to that arrangement, and the management OS VM 31 may determine which application programs 50 of the guest OS VMs 41, 42, and 43 have their execution states to be controlled.

In the first embodiment, the management OS VM 31 designates one of the guest OS VMs 41, 42, and 43 as the guest OS VM having its process control to be cancelled. The designated one of the guest OS VMs 41, 42, and 43 designates the application program 50 having its execution control to be cancelled. However, the embodiments are not limited to that arrangement, and the management OS VM 31 may determine which application program 50 of the guest OS VMs 41, 42, and 43 has its execution control to be cancelled. In such a case, the management OS VM 31 should manage the load fluctuations of the application programs 50 having execution control performed thereon at the guest OS VMs 41, 42, and 43.

In the first embodiment, the application program 50 having the smallest processing load is selected as the application program 50 having its execution control to be cancelled. By first cancelling the execution control on the application program 50 having the smallest processing load, a rapid increase in processing load can be reduced and/or prevented. However, the embodiment is not limited to this arrangement. For example, the application program 50 having the largest processing load or the application program 50 having its control started first may be selected as the execution control cancellation object.

In the PC 10 of the first embodiment, user authentication is performed based on user IDs and passwords that are input by users using the input/output device sets 51, 52, and 53. However, user authentication may not be necessary. For example, each of the users using the input/output device sets 51, 52, and 53 may input only a user ID, and the management OS 31a may activate the one of the guest OS 41a, 42a, or 43a corresponding to the input user ID.

The PC 10 of the first embodiment uses a CPU load (a CPU usage rate) as the processing load of each of the guest OS VMs 41, 42, and 43, but the embodiment is not limited to that arrangement. For example, the utilization (the memory usage rate) of the RAM 3 allocated to each of the guest OS VMs 41, 42, and 43 may be used as the information indicating the processing load. Alternatively, the network usage rate may be used if the guest OS VMs 41, 42, and 43 can be connected to a network, and the application response speed at which each application program 50 is executed may also be used, for example.

The PC 10 of the first embodiment includes the management OS VM 31, as well as the guest OS VMs 41, 42, and 43. However, one of the guest OS VMs 41, 42, and 43 may include the functions of the management OS VM 31 of the first embodiment, for example. In such a case, the license fee for the management OS 31a and each resource to be allocated to the management OS VM 31 can be reduced.

Second Embodiment

The following is a description of a PC according to a second embodiment. The PC of the second embodiment can be realized with the same configuration as the PC 10 of the first embodiment. Therefore, the same components as those of the first embodiment are denoted by the same reference numerals as those used in the first embodiment, and explanation of the components is not repeated here.

In the above described first embodiment, the management OS VM 31 determines that the PC 10 is in a high-load state, when the total amount of the CPU loads of the guest OS VMs 41, 42, and 43 obtained from the VM load table 4g on a regular basis (every one second, for example) is equal to or larger than a specific value (90%, for example). When determining that the PC 10 is in a high-load state, the management OS VM 31 sends a request for a processing load reduction to one of the guest OS VMs 41, 42, and 43.

In the second embodiment, on the other hand, the management OS VM 31 clocks the period of time (high-load state duration) during which the total amount of the CPU loads of the guest OS VMs 41, 42, and 43 obtained from the VM load table 4g on a regular basis (every one second, for example) is equal to or larger than the specific value (90%, for example). When the clocked high-load state duration reaches a specific period of time (five seconds, for example), the management OS VM 31 determines that the PC 10 is in a high-load state.

In the PC 10 of the second embodiment, the CPU 1 executes the various kinds of control programs stored in the ROM 2 or the HDD 4, to realize the same functions as those illustrated in FIGS. 5 and 6.

The VM load determining unit 31e of the second embodiment determines whether the total amount of the CPU loads obtained from the VM load monitoring unit 31d is equal to or larger than the specific value (90%, for example). If the VM load determining unit 31e determines that the total amount of the CPU loads is smaller than the specific value (90%, for example), the current time is stored as the high-load state start time into the RAM 3, for example. The current time is obtained based on the clock function of the CPU 1, for example.

If the VM load determining unit 31e determines that the total amount of the CPU loads obtained from the VM load monitoring unit 31d is equal to or larger than the specific value (90%, for example), the current time is obtained. The VM load determining unit 31e then calculates the period of time (the high-load state duration) between the high-load state start time stored in the RAM 3 and the current time. The VM load determining unit 31e determines whether the calculated high-load state duration is equal to or longer than a specific period of time (five seconds, for example). The VM load determining unit 31e repeats the above procedures until the high-load state duration becomes equal to or longer than the specific period of time (five seconds, for example).

If the VM load determining unit 31e determines that the high-load state duration is equal to or longer than the specific period of time (five seconds, for example), the VM load determining unit 31e determines that the PC 10 is in a high-load state. Having determined that the PC 10 is in a high-load state, the VM load determining unit 31e identifies the guest OS VM having the largest CPU load among the guest OS VMs 41, 42, and 43, based on the CPU loads of the guest OS VMs 41, 42, and 43. The VM load determining unit 31e notifies the VM notifying unit 31f of the identified guest OS VM 41, 42, or 43.

The specific period of time (five seconds, for example) that is the criterion for determining whether the PC 10 is in a high-load state is stored beforehand in the HDD 4 allocated to the management OS VM 31, for example. This period of time can be changed by the manager of the PC 10, for example.

The VM notifying unit 31f sends a request for a processing load reduction to the guest OS 41a, 42a, or 43a of the guest OS VM 41, 42, or 43 designated in the notification from the VM load determining unit 31e. The guest OS VM 41, 42, or 43, which receives the request for a processing load reduction, controls the execution state of the application program 50 having the largest processing load among the application programs 50 being executed. In this manner, the processing load of the guest OS VMs 41, 42, and 43 is reduced.

Other than the VM load determining unit 31e, the respective functions realized by the CPU 1 of the second embodiment perform the same procedures as those of the first embodiment, and therefore, explanation of the procedures is not repeated here.

In the PC 10 of the second embodiment, the procedures to be performed by the management OS VM 31 to activate the guest OS VMs 41, 42, and 43 are the same as those of the first embodiment illustrated in FIG. 9, and therefore, explanation of the procedures is not repeated here.

Figure 15:
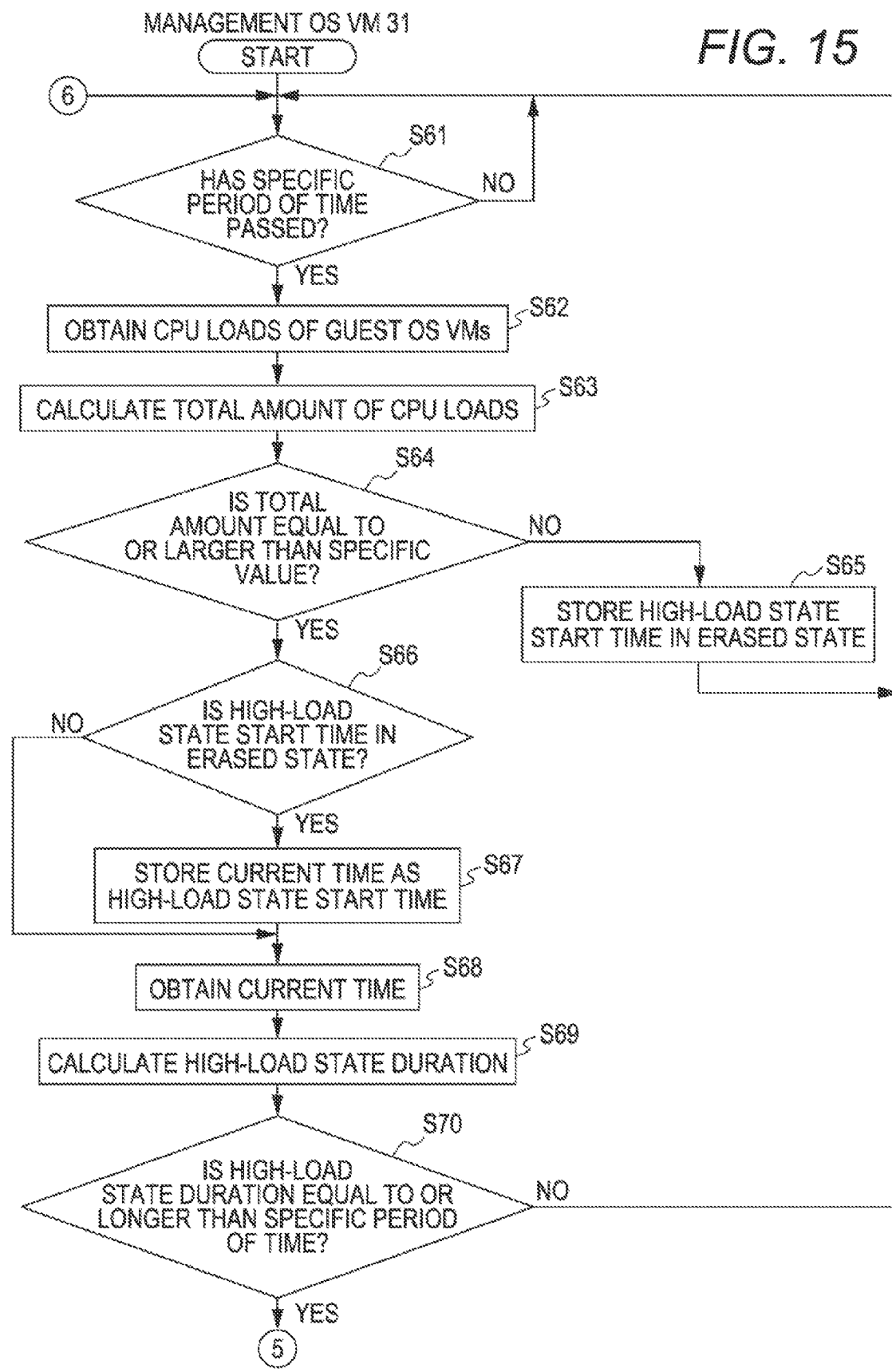
FIG. 15 illustrates a flowchart of a load control operation according to a second embodiment.
Figure 16:
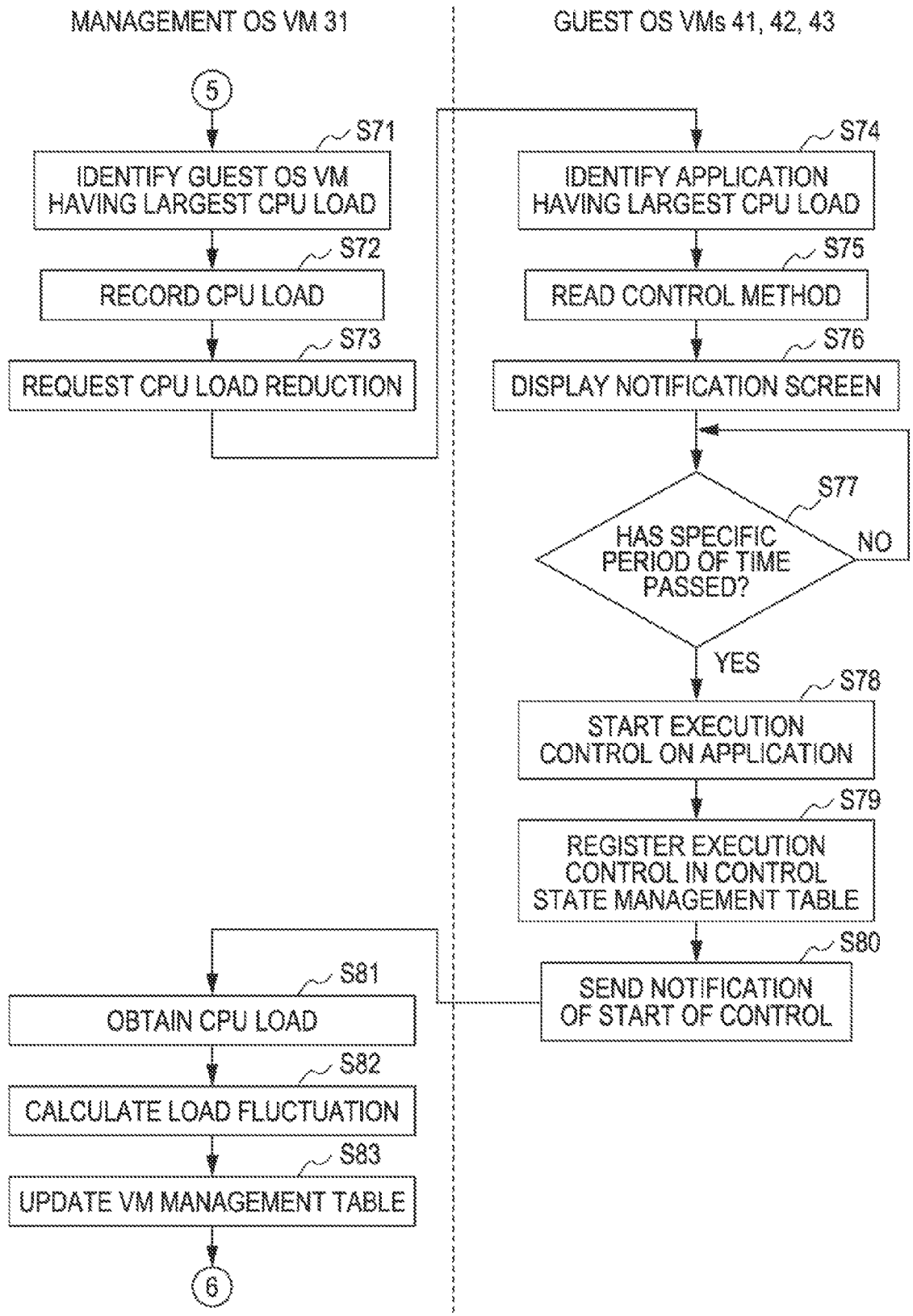
FIG. 16 illustrates a flowchart of the load control operation according to the second embodiment.

Referring now to a flowchart, the operation to be performed by the management OS VM 31 when the processing load of the guest OS VMs 41, 42, and 43 becomes large in the PC 10 of the second embodiment is described. FIG. 15 and FIG. 16 are the flowchart of a load control operation of the second embodiment. The following procedures are to be performed by the management OS VM 31 and the guest OS VMs 41, 42, and 43 in accordance with a control program stored in the ROM 2 or the HDD 4 of the PC 10, for example. In FIG. 16, the left-side one of the two regions partitioned by a broken line depicts the procedures to be carried out by the management OS VM 31, and the right-side region depicts the procedures to be carried out by the guest OS VMs 41, 42, and 43.

The management OS VM 31 clocks a specific period of time, and determines whether the specific period of time (one second, for example) has passed (S61). If the management OS VM 31 determines that the specific period of time has not passed (S61: NO), the management OS VM 31 stands by, while performing other procedures. If the management OS VM 31 determines that the specific period of time has passed (S61: YES), the management OS VM 31 obtains the CPU loads of the respective guest OS VMs 41, 42, and 43 from the VM load table 4g that is updated by the VMM 21 (S62). The management OS VM 31 calculates the total amount of the obtained CPU loads of the guest OS VMs 41, 42, and 43 (S63), and determines whether the calculated total amount is equal to or larger than a specific value (90%, for example) (S64).

If the management OS VM 31 determines that the total amount of the CPU loads is smaller than the specific value (S64: NO), the management OS VM 31 stores a high-load state start time in an erased state into the RAM 3 or the like (S65), and returns to the procedure of step S61. If the management OS VM 31 determines that the total amount of the CPU loads is equal to or larger than the specific value (S64: YES), the management OS VM 31 determines whether the high-load state start time is in an erased state (S66). If the management OS VM 31 determines that the high-load state start time is in an erased state (S66: YES), the management OS VM 31 stores the current time as the high-load state start time into the RAM 3 or the like (S67), and obtains the current time (S68).

If the management OS VM 31 determines that the high-load state start time is not in an erased state (S66: NO), the management OS VM 31 skips the procedure of step S67, and obtains the current time (S68). From the high-load state start time stored in the RAM 3 or the like at step S67, the management OS VM 31 calculates the high-load state duration before the current time obtained at step S68 (S69).

The management OS VM 31 determines whether the calculated high-load state duration is equal to or longer than the specific period of time (five seconds, for example) (S70). If the management OS VM 31 determines that the high-load state duration is shorter than the specific period of time (S70: NO), the management OS VM 31 returns to the procedure of step S61. If the management OS VM 31 determines that the high-load state duration is equal to or longer than the specific period of time (S70: YES), the management OS VM 31 determines which one of the guest OS VMs 41, 42, and 43 has the largest CPU load, based on the CPU loads obtained at step S62 (S71). The management OS VM 31 records the CPU load of the identified one of the guest OS VMs 41, 42, and 43 (S72), and requests the identified one of the guest OS VMs 41, 42, and 43 to reduce the CPU load (S73).

The procedures from step S74 to step S83 below are the same as the procedures of step S18 to step S27 of the first embodiment illustrated in FIG. 11, and therefore, explanation of the procedures is not repeated here. Through the above operation, the management OS VM 31 can use the VM management table 4f to manage the processing loads of the guest OS VMs 41, 42, and 43, which are reduced by controlling the execution states of the application programs 50.

The procedures to be performed by the management OS VM 31 to monitor the processing loads of the guest OS VMs 41, 42, and 43, and cancel the control on the application programs 50 having execution control performed thereon as needed in the PC 10 of the second embodiment are the same as the procedures of the first embodiment illustrated in FIGS. 12 and 13, and therefore, explanation of the procedures is not repeated here. Also, the procedures to be performed to end the processes of the guest OS VMs 41, 42, and 43 in the PC 10 of the second embodiment are the same as the procedures of the first embodiment illustrated in FIG. 14, and therefore, explanation of the procedures is not repeated here.

As described above, when a high-load state in which the total amount of the CPU loads of the guest OS VMs 41, 42, and 43 is equal to or larger than the specific value (90%, for example) lasts over the specific period of time (five seconds, for example), the PC 10 is determined to be in a high-load state in the second embodiment. Accordingly, even if a high-load state is temporarily observed at the time of activation of each application program 50, for example, the PC 10 is determined not to be in a high-load state. Therefore, only when a high-load state lasts over the specific period of time, the processing load of the guest OS VMs 41, 42, and 43 is reduced. In this manner, frequent control on the execution states of the application programs 50 being executed at the guest OS VMs 41, 42, and 43 can be reduced and/or prevented.

Third Embodiment

The following is a description of a PC according to a third embodiment. The PC of the third embodiment can be realized with the same configuration as the PC 10 of the first embodiment. Therefore, the same components as those of the first embodiment are denoted by the same reference numerals as those used in the first embodiment, and explanation of the components is not repeated here.

In the first embodiment, when the total amount of the CPU loads of the guest OS VMs 41, 42, and 43 is equal to or larger than the specific value (90%, for example), the management OS VM 31 sends a request for a processing load reduction to the guest OS VM having the largest CPU load among the guest OS VMs 41, 42, and 43.

In the third embodiment, a maximum allowable CPU load is set for each of the guest OS VMs 41, 42, and 43. A request for a processing load reduction is sent to the guest OS VM having a CPU load that is equal to or larger than the maximum allowable CPU load and is larger than the CPU loads of the other guest OS VMs among the guest OS VMs 41, 42, and 43. Accordingly, even if the CPU load of a guest OS VM is largest among the guest OS VMs 41, 42, and 43, the request for a processing load reduction is not sent to the guest OS VM, as long as the CPU load is smaller than the maximum allowable CPU load.

Figure 17:
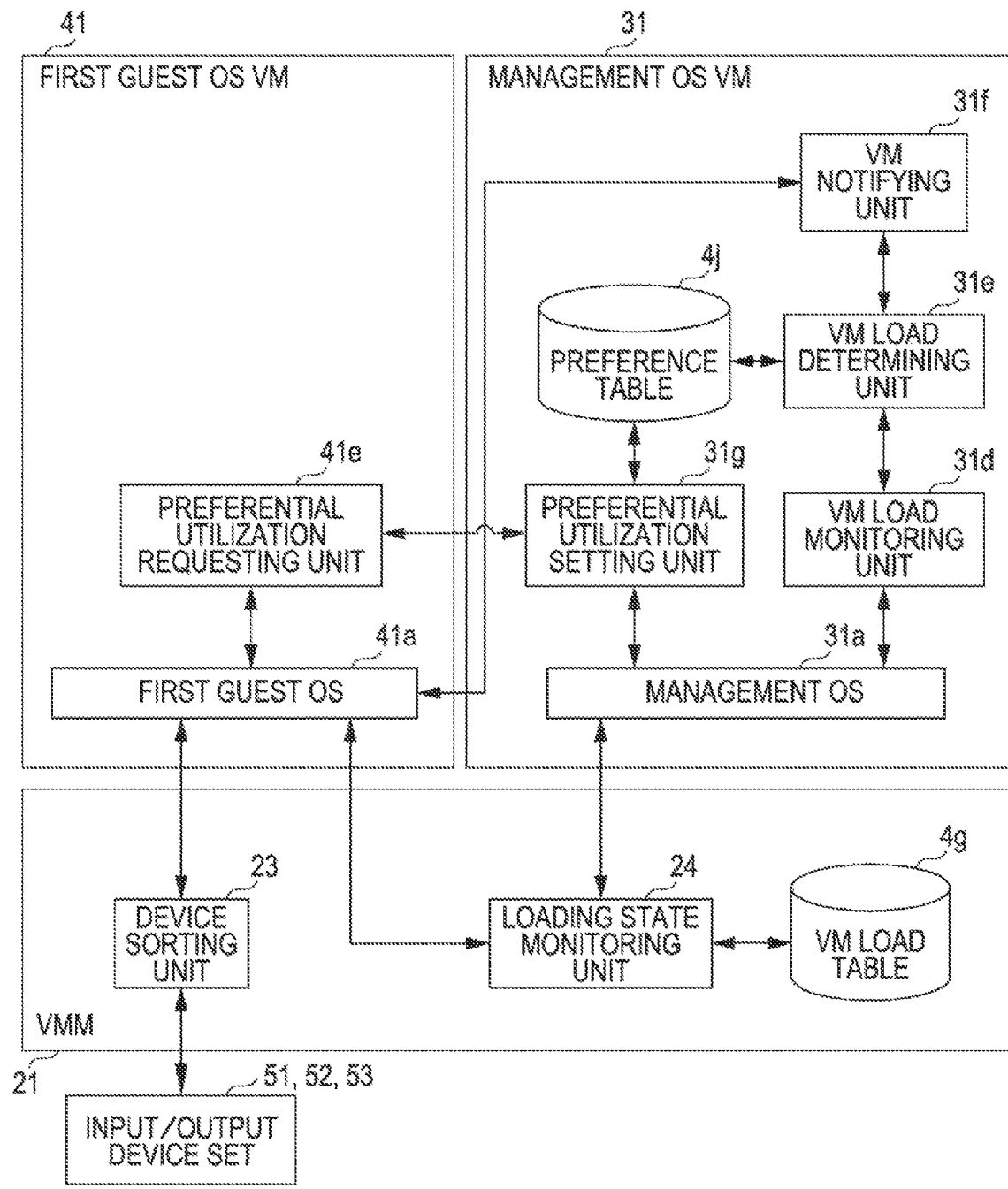
FIG. 17 illustrates a functional configuration of a PC of a third embodiment.

In the PC 10 of the third embodiment, the CPU 1 executes the various control programs stored in the ROM 2 or the HDD 4, to realize the respective functions illustrated in FIGS. 5 and 6, for example. The management OS VM 31 of the third embodiment has the function of a preferential utilization setting unit 31g, as well as the functions illustrated in FIGS. 5 and 6. The guest OS VM 41 of the third embodiment has the function of a preferential utilization requesting unit 41e, as well as the functions illustrated in FIG. 6. FIG. 17 illustrates a functional configuration of the PC 10 of the third embodiment. It should be noted that FIG. 17 depicts only some of the functions of the VMM 21, the management OS VM 31 and the guest OS VM 41.

In the PC 10 of the third embodiment, each of the users of the guest OS VMs 41, 42, and 43 sends a request for preferential utilization via the input/output device sets 51, 52, and 53 in use, so as to have the preferential use of the PC 10 from the other users. To request the preferential utilization, a specific button or menu may be selected, for example.

In the guest OS VM 41 of the third embodiment, the preferential utilization requesting unit 41e receives the preferential utilization request via the corresponding input/output device set 51, 52, or 53. Upon receipt of the preferential utilization request from the user, the preferential utilization requesting unit 41e requests the preferential utilization setting unit 31g of the management OS VM 31 to set up the preferential utilization.

In the management OS VM 31 of the third embodiment, when the preferential utilization setting unit 31g receives the request for setting up the preferential utilization from the guest OS VM 41, 42, or 43, sets up the preferential utilization for the guest OS VM 41, 42, or 43, which has sent the request. The preferential utilization setting unit 31g first determines whether the preferential utilization has already been set up for the guest OS VM 41, 42, or 43, which has sent the request for the preferential utilization setup, based on the contents of the preference table 4j illustrated in FIG. 18.

FIG. 18 illustrates the contents included in the preference table 4j. As illustrated in FIG. 18, in the preference table 4j, the VM IDs of the guest OS VMs 41, 42, and 43 and the maximum allowable CPU load set for each of the guest OS VMs 41, 42, and 43 are registered. The VM IDs and the maximum allowable CPU load are associated with each other. The preference table 4j beforehand may store "35" as the maximum allowable CPU load set for each of the guest OS VMs 41, 42, and 43, for example. The maximum allowable CPU load set for each of the guest OS VMs 41, 42, and 43 included in the preference table 4j can be updated by the preferential utilization setting unit 31g.

The preferential utilization setting unit 31g determines whether the preference table 4j has "65" included as the maximum allowable CPU load set for the guest OS VM 41, 42, or 43, which has sent the request for the preferential utilization setup. If the preferential utilization setting unit 31g determines that "65" is included as the maximum allowable CPU load, the preferential utilization setting unit 31g determines that the preferential utilization has already been set up for the guest OS VM 41, 42, or 43, which has requested for the preferential utilization setup, for example. If the preferential utilization setting unit 31g determines that "65" is not included as the maximum allowable CPU load, that is, "35" is included as the maximum allowable CPU load, the preferential utilization setting unit 31g determines that the preferential utilization has not been set up for the guest OS VM 41, 42, or 43, which has requested for the preferential utilization setup, for example.

When determining that the preferential utilization has already been set up for the guest OS VM 41, 42, or 43, which has requested for the preferential utilization setup, the preferential utilization setting unit 31g notifies the requester guest OS VM 41, 42, or 43 that the preferential utilization has already been set up. In this case, the preferential utilization requesting unit 41e of the guest OS VM 41, 42, or 43 causes the corresponding monitor 51a, 52a, or 53a to display an error message to notify the user that the preferential utilization setup has failed since the preferential utilization has already been set up.

When determining that the preferential utilization has not been set up for the guest OS VM 41, 42, or 43, which has requested for the preferential utilization setup, the preferential utilization setting unit 31g determines whether the requested preferential utilization can be set up. For example, the preferential utilization setting unit 31g determines whether the requested preferential utilization can be set up, based on whether there is a guest OS VM that already has preferential utilization set up among the guest OS VMs 41, 42, and 43. Since it may be difficult to secure a 65% CPU load for a plurality of guest OS VMs 41, 42, and 43, the preferential utilization may be limited to being set up for only one of the guest OS VMs 41, 42, and 43, for example.

When there is a guest OS VM 41 that already has preferential utilization set up for it, the preferential utilization setting unit 31g determines that the requested preferential utilization setup is not acceptable and/or possible. When determining that the requested preferential utilization setup is not acceptable and/or possible, the preferential utilization setting unit 31g notifies the requester guest OS VM 41, 42, or 43 that the preferential utilization setup is not acceptable and/or possible. In such a case, the preferential utilization requesting unit 41e of the guest OS VM 41, 42, or 43 causes the corresponding monitor 51a, 52a, or 53a to display an error message to notify the user that the preferential utilization setup has failed.

When determining that the requested preferential utilization can be set up, the preferential utilization setting unit 31g updates the maximum allowable CPU load of the guest OS VM 41, 42, or 43, which has requested for the preferential utilization setup, to "65" in the preference table 4j, for example. In this manner, the preferential utilization setting unit 31g sets up the preferential utilization for the guest OS VM 41, 42, or 43, which has requested for the preferential utilization setup.

After setting up the preferential utilization, the preferential utilization setting unit 31g notifies the guest OS VM 41, 42, or 43, which has requested for the preferential utilization setup, that the preferential utilization setup is completed. In this case, the preferential utilization requesting unit 41e of the guest OS VM 41, 42, or 43 causes the corresponding monitor 51a, 52a, or 53a to display a notification screen to notify the user that the preferential utilization has been set up.

The VM load determining unit 31e of the third embodiment determines whether the total amount of the CPU loads obtained from the VM load monitoring unit 31d is equal to or larger than a specific value (90%, for example). If the VM load determining unit 31e determines that the total amount of the CPU loads is smaller than the specific value (90%, for example), the VM load determining unit 31e determines that the PC 10 is not in a high-load state, and does not perform any procedure. If the VM load determining unit 31e determines that the total amount of the CPU loads is equal to or larger than the specific value (90%, for example), the VM load determining unit 31e determines that the PC 10 is in a high-load state. Based on the CPU loads of the guest OS VMs 41, 42, and 43, the VM load determining unit 31e then identifies the guest OS VM having the largest CPU load among the guest OS VMs 41, 42, and 43.

The VM load determining unit 31e obtains the maximum allowable CPU load set for the identified guest OS VM 41, 42, or 43, from the preference table 4j. The VM load determining unit 31e then determines whether the CPU load of the identified one of the guest OS VMs 41, 42, and 43 is larger than the maximum allowable CPU load obtained from the preference table 4j. If the CPU load of the identified one of the guest OS VMs 41, 42, and 43 is not larger than the maximum allowable CPU load, the VM load determining unit 31e does not request this guest OS VM 41, 42, or 43 to reduce the processing load. The VM load determining unit 31e then identifies the guest OS VM having the second largest CPU load among the guest OS VMs 41, 42, and 43.

The VM load determining unit 31e obtains the maximum allowable CPU load set for the identified guest OS VM, which has the second largest CPU load among the guest OS VMs 41, 42, and 43, from the preference table 4j. The VM load determining unit 31e then determines whether the CPU load of the guest OS VM that has the second largest CPU load among the guest OS VMs 41, 42, and 43 is larger than the maximum allowable CPU load obtained from the preference table 4j. If the CPU load of the guest OS VM having the second largest CPU load among the guest OS VMs 41, 42, and 43 is not larger than the maximum allowable CPU load, the VM load determining unit 31e does not request this guest OS VM 41, 42, or 43 to reduce the processing load. The VM load determining unit 31e then identifies the guest OS VM having the third largest CPU load among the guest OS VMs 41, 42, and 43.

When determining that the CPU load of the identified one of the guest OS VMs 41, 42, and 43 is larger than the maximum allowable CPU load, the VM load determining unit 31e notifies the VM notifying unit 31f of the identified guest OS VM 41, 42, or 43.

The VM notifying unit 31f sends a request for a processing load reduction to the guest OS 41a, 42a, or 43a of the guest OS VM 41, 42, or 43 designated in the notification from the VM load determining unit 31e. The guest OS VM 41, 42, or 43, to which the request for a processing load reduction has been sent, controls the execution state of the application program 50 having the largest processing load among the application programs 50 being executed. In this manner, the processing load of the guest OS VMs 41, 42, and 43 can be reduced.

As described above, in the third embodiment, the processing load of the guest OS VMs 41, 42, and 43 is not reduced, as long as the large CPU load among the guest OS VMs 41, 42, and 43 is smaller than the maximum allowable CPU load set in the preference table 4j. Accordingly, the guest OS VM having the largest allowable CPU load set in the preference table 4j among the guest OS VMs 41, 42, and 43 can secure the processing load preferentially from the other ones of the guest OS VMs 41, 42, and 43.

Other than the above described preferential utilization setting unit 31g, the VM load determining unit 31e, and the preferential utilization requesting unit 41e, the respective functions realized by the CPU 1 of the third embodiment perform the same procedures as the procedures of the first embodiment, and therefore, explanation of the procedures is not repeated here.

In the PC 10 of the third embodiment, the procedures to be performed by the management OS VM 31 to activate the guest OS VMs 41, 42, and 43 are the same as the procedures of the first embodiment illustrated in FIG. 9, and therefore, explanation of the procedures is not repeated here.

Figure 19:
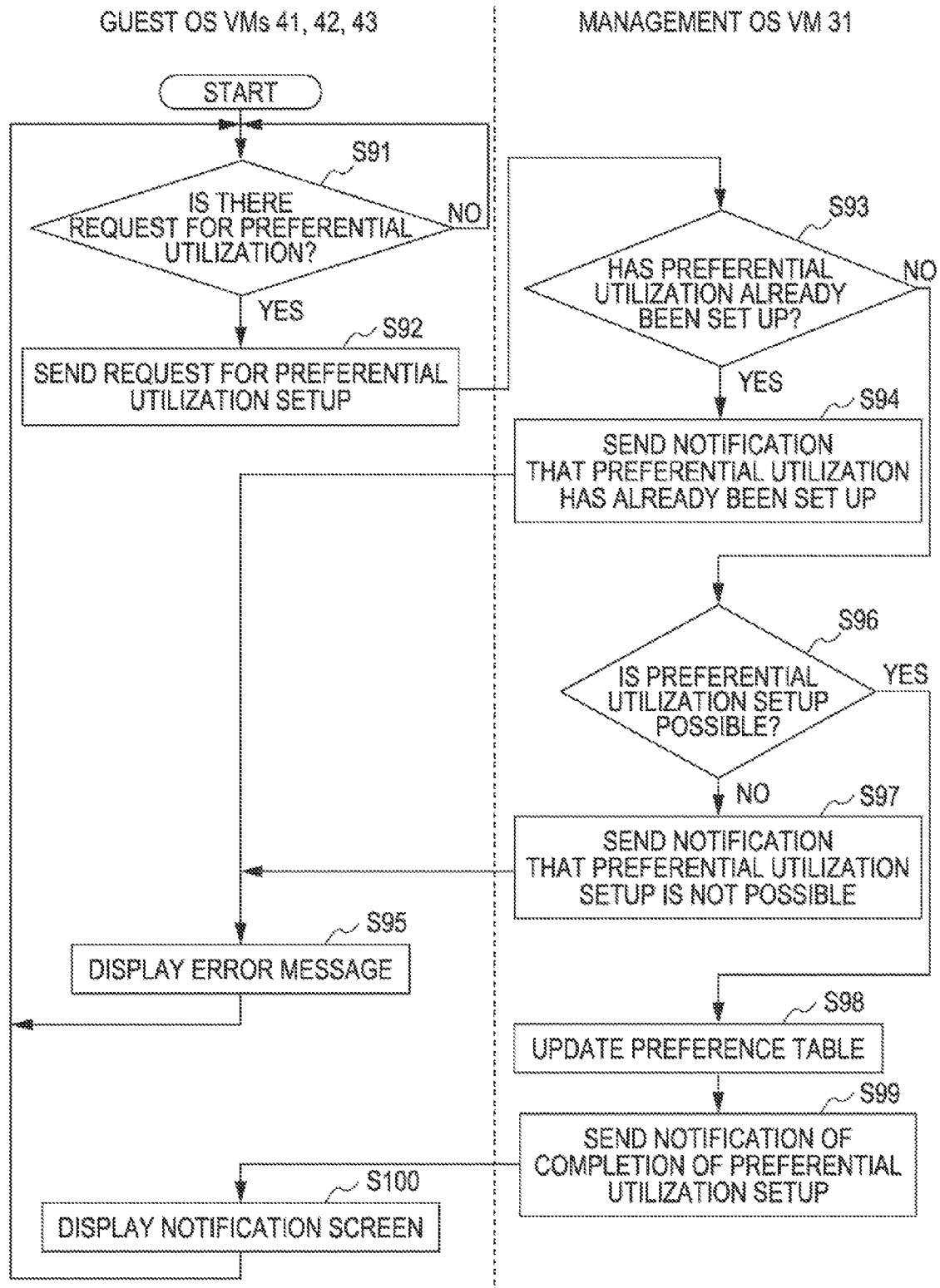
FIG. 19 illustrates a flowchart of a processing to be performed to set up preferential utilization.

Referring now to a flowchart, the operation to be performed to set up preferential utilization for one of the guest OS VMs 41, 42, and 43 in the PC 10 of the third embodiment is described. FIG. 19 illustrates the flowchart of the preferential utilization setting operation. The following procedures are to be performed by the guest OS VMs 41, 42, and 43 and the management OS VM 31 in accordance with a control program stored in the ROM 2 or the HDD 4 of the PC 10, for example. In FIG. 19, the left-side one of the two regions partitioned by a broken line depicts the procedures to be carried out by the guest OS VMs 41, 42, and 43, and the right-side region depicts the procedures to be carried out by the management OS VM 31.

Each of the guest OS VMs 41, 42, and 43 determines whether a preferential utilization request has been sent via the corresponding one of the input/output device sets 51, 52, and 53 (S91). When determining that preferential utilization is not requested (S91: NO), each of the guest OS VMs 41, 42, and 43 stands by, while performing other procedures. When determining that preferential utilization is requested (S91: YES), the guest OS VM 41, 42, or 43 requests the management OS VM 31 to set up the preferential utilization (S92).

Upon receipt of the request for the preferential utilization setup from the guest OS VM 41, 42, or 43, the management OS VM 31 determines whether the requester guest OS VM 41, 42, or 43 already has a preferential utilization set, based on the contents of the preference table 4j (S93). When determining that preferential utilization has already been set (S93: YES), the management OS VM 31 notifies the requester guest OS VM 41, 42, or 43 that preferential utilization has already been set (S94).

Upon receipt of the notification that preferential utilization has already been set, the guest OS VM 41, 42, or 43 causes the corresponding monitor 51a, 52a, or 53a to display an error message to notify the user that the preferential utilization setup has failed (S95). The guest OS VMs 41, 42, and 43 then return to the procedure of step S91.

When determining that preferential utilization has not been set (S93: NO), the management OS VM 31 determines whether the requested preferential utilization can be set up (S96). When determining that the requested preferential utilization setup is not acceptable and/or possible (S96: NO), the management OS VM 31 notifies the requester guest OS VM 41, 42, or 43 that the requested preferential utilization setup is not acceptable and/or possible (S97).

Upon receipt of the notification that the requested preferential utilization is not acceptable and/or possible, the guest OS VM 41, 42, or 43 causes the corresponding monitor 51a, 52a, or 53a to display an error message to notify the user that the requested preferential utilization setup has failed (S95). The guest OS VMs 41, 42, and 43 then return to the procedure of step S91.

When determining that the requested preferential utilization setup is acceptable and/or possible (S96: YES), the management OS VM 31 updates the maximum allowable CPU load set for the guest OS VM 41, 42, or 43, which has requested for the preferential utilization setup, to "65" in the preference table 4j (S98). After updating the preference table 4j, the management OS VM 31 notifies the guest OS VM 41, 42, or 43, which has requested for the preferential utilization setup, of the completion of the preferential utilization setup (S99).

Upon receipt of the notification of the completion of the preferential utilization setup, the guest OS VM 41, 42, or 43 causes the corresponding monitor 51a, 52a, or 53a to display a notification screen to notify the user that the preferential utilization has been set up (S100). The guest OS VMs 41, 42, and 43 then return to the procedure of step S91.

Figure 20:
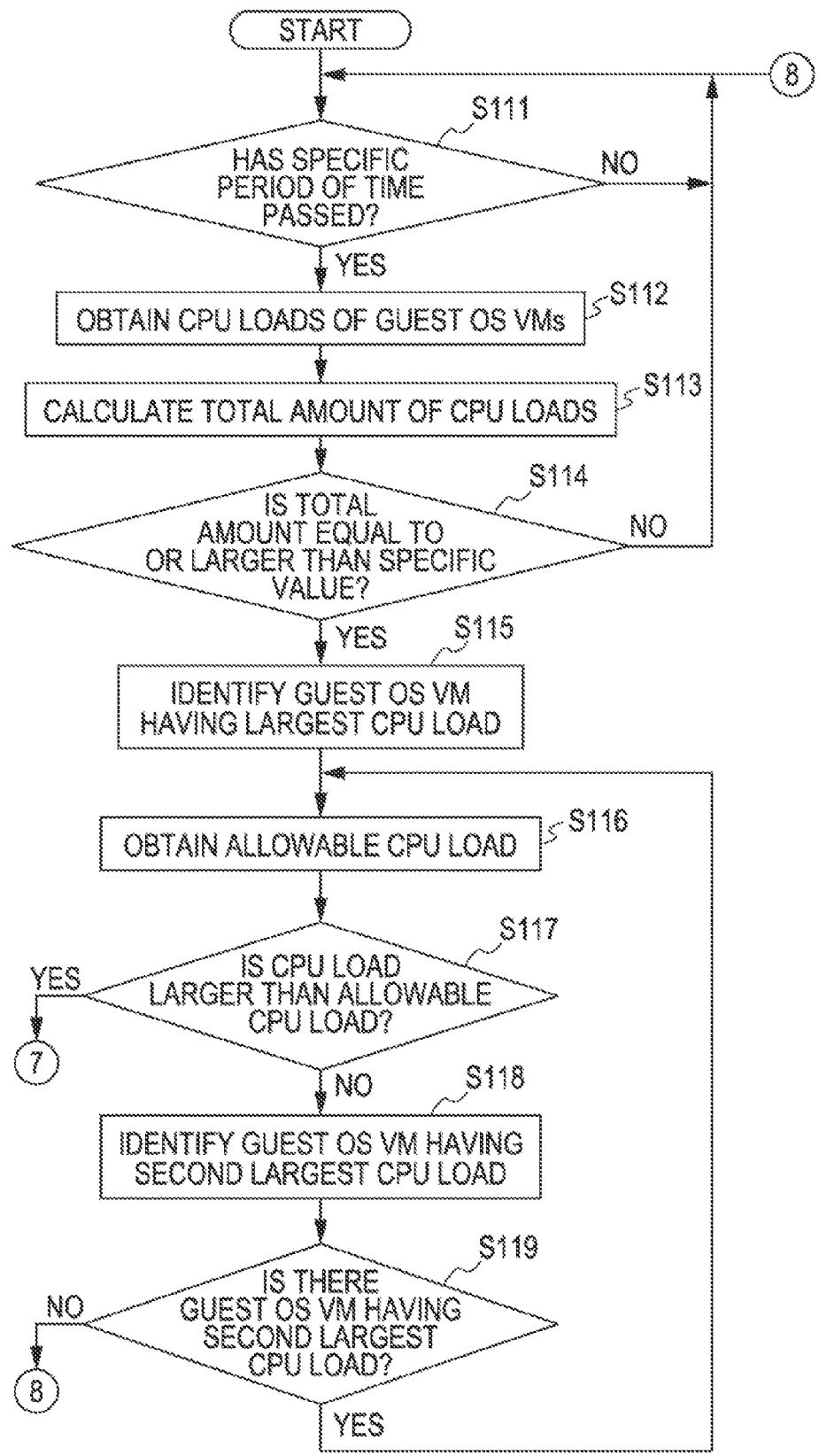
FIG. 20 illustrates a flowchart of a load control operation according to the third embodiment.
Figure 21:
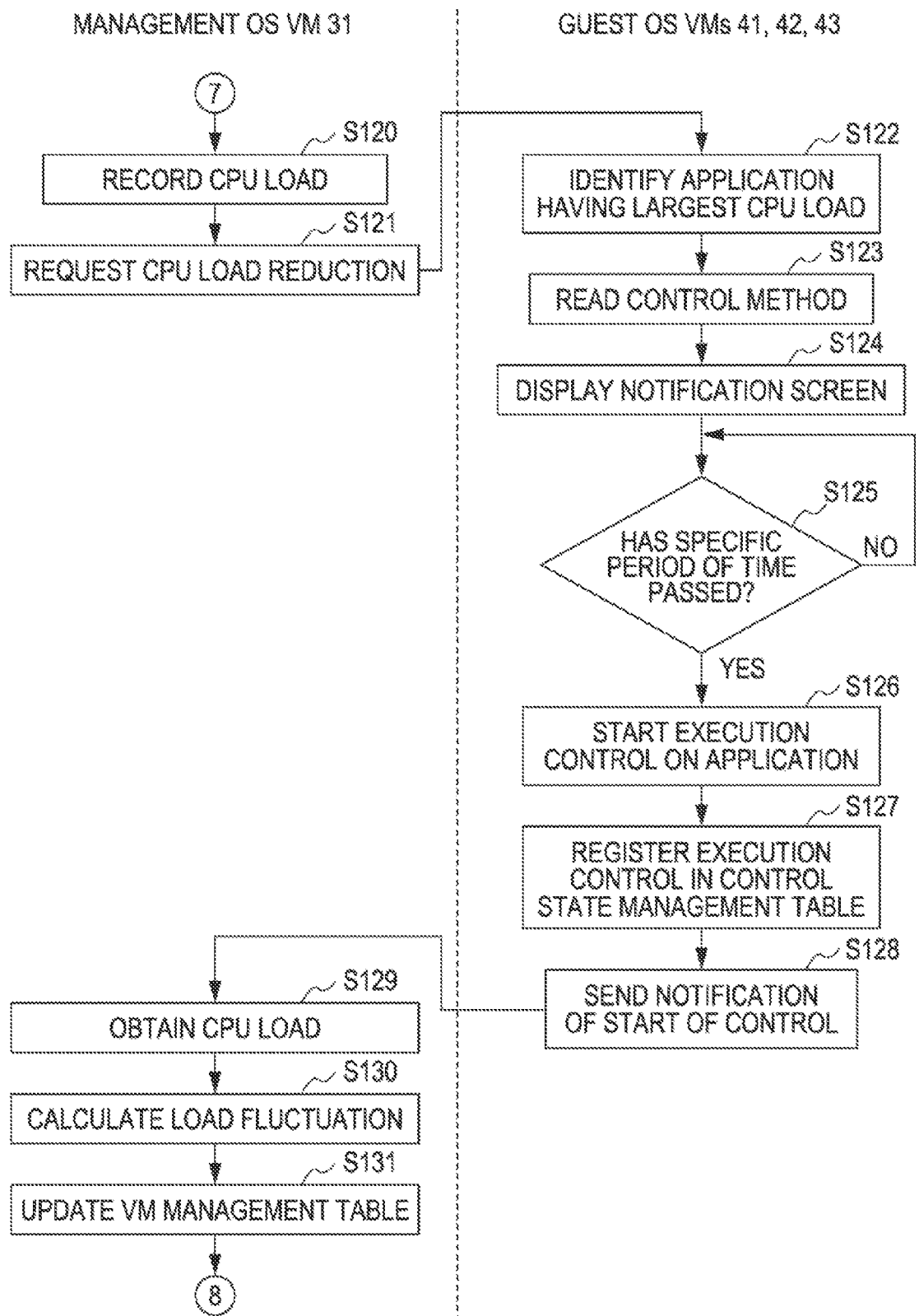
FIG. 21 illustrates a flowchart of the load control operation according to the third embodiment.

Referring now to another flowchart, the operation to be performed by the management OS VM 31 when the processing load of the guest OS VMs 41, 42, and 43 becomes large in the PC 10 of the third embodiment is described. FIG. 20 and FIG. 21 are the flowchart of a load control operation of the third embodiment. The following procedures are to be performed by the management OS VM 31 and the guest OS VMs 41, 42, and 43 in accordance with a control program stored in the ROM 2 or the HDD 4 of the PC 10, for example. In FIG. 21, the left-side one of the two regions partitioned by a broken line depicts the procedures to be carried out by the management OS VM 31, and the right-side region depicts the procedures to be carried out by the guest OS VMs 41, 42, and 43.

The management OS VM 31 clocks a specific period of time, and determines whether the specific period of time (one second, for example) has passed (S111). If the management OS VM 31 determines that the specific period of time has not passed (S111: NO), the management OS VM 31 stands by, while performing other procedures. If the management OS VM 31 determines that the specific period of time has passed (S111: YES), the management OS VM 31 obtains the CPU loads of the respective guest OS VMs 41, 42, and 43 from the VM load table 4g that is updated by the VMM 21 (S112). The management OS VM 31 calculates the total amount of the obtained CPU loads of the guest OS VMs 41, 42, and 43 (S113), and determines whether the calculated total amount is equal to or larger than a specific value (90%, for example) (S114).

If the management OS VM 31 determines that the total amount of the CPU loads is smaller than the specific value (S114: NO), the management OS VM 31 returns to the procedure of step S111. If the management OS VM 31 determines that the total amount of the CPU loads is equal to or larger than the specific value (S114: YES), the management OS VM 31 identifies the guest OS VM having the largest CPU load among the guest OS VMs 41, 42, and 43, based on the CPU loads obtained at step S112 (S115). The management OS VM 31 obtains the maximum allowable CPU load set for the identified one of the guest OS VM 41, 42, and 43, from the preference table 4j (S116).

The management OS VM 31 then determines whether the CPU load of the guest OS VM 41, 42, or 43, obtained at step S112 is larger than the maximum allowable CPU load obtained from the preference table 4j (S117). When determining that the CPU load of the guest OS VM 41, 42, or 43 is not larger than the maximum allowable CPU load (S117: NO), the management OS VM 31 identifies the guest OS VM having the second largest CPU load among the guest OS VMs 41, 42, and 43 (S118).

After identifying the guest OS VM having the second largest CPU load, the management OS VM 31 determines whether the corresponding guest OS VM actually exists (S119). When determining that the guest OS VM having the second largest CPU load does not exist (S119: NO), the management OS VM 31 returns to the procedure of step S111. When determining that the guest OS VM having the second largest CPU load exists (S119: YES), the management OS VM 31 returns to the procedure of step S116, and obtains the maximum allowable CPU load set for the guest OS VM 41, 42, or 43, which is identified at step S118, from the preference table 4j (S116). The management OS VM 31 repeats the procedures of steps S116 through S119, until the management OS VM 31 determines that the CPU load of the identified one of the guest OS VM 41, 42, and 43 is larger than the maximum allowable CPU load, or determines that the CPU loads of all the guest OS VMs are not larger than the respective maximum allowable CPU loads.

When determining that the CPU load of the identified one of the guest OS VMs 41, 42, and 43 is larger than the maximum allowable CPU load (S117: YES), the management OS VM 31 records the CPU load of the identified one of the guest OS VMs 41, 42, and 43 (S120). The management OS VM 31 then requests the identified one of the guest OS VMs 41, 42, and 43 to reduce the CPU load (S121).

The procedures from step S122 to step S131 are the same as the procedures from step S18 to step S27 of the first embodiment illustrated in FIG. 11, and therefore, explanation of the procedures is not repeated here. Through this operation, the management OS VM 31 can use the VM management table 4f to manage the processing loads of the guest OS VM 41, 42, and 43, which are reduced by controlling the execution states of the application programs 50.

The procedures to be performed by the management OS VM 31 to monitor the processing loads of the guest OS VMs 41, 42, and 43, and cancel the control on the application programs 50 having execution control performed thereon as needed in the PC 10 of the third embodiment are the same as the procedures of the first embodiment illustrated in FIGS. 12 and 13, and therefore, explanation of the procedures is not repeated here. Also, the procedures to be performed to end the processes of the guest OS VMs 41, 42, and 43 in the PC 10 of the third embodiment are the same as the procedures of the first embodiment illustrated in FIG. 14, and therefore, explanation of the procedures is not repeated here.

As described above, in the third embodiment, the processing load of the guest OS VMs 41, 42, and 43 is not reduced, as long as the largest CPU load among the guest OS VMs 41, 42, and 43 is smaller than the maximum allowable CPU load set in the preference table 4j. Accordingly, each of the guest OS VMs 41, 42, and 43 can secure the use of the maximum allowable CPU loads set in the preference table 4j. Thus, the guest OS VM having the largest allowable CPU load set in the preference table 4j among the guest OS VMs 41, 42, and 43 is allowed to use a CPU load larger than the CPU loads allowed for the other guest OS VMs, and can perform processes preferentially from the other ones of the guest OS VMs 41, 42, and 43.

The PC 10 of the third embodiment has been described as a modification of the PC 10 of the first embodiment. However, the configuration of the third embodiment may also be applied to the PC 10 of the second embodiment.

In the third embodiment, a 35% CPU load is secured as the maximum allowable CPU load for each of the guest OS VMs 41, 42, and 43 for which preferential utilization has not been set up, and a 65% CPU load is also secured as the maximum allowable CPU load for the guest OS VMs 41, 42, and 43 for which preferential utilization has been set up. However, the maximum allowable CPU loads for the guest OS VMs 41, 42, and 43 are not limited to those values, and may be arbitrarily changed by the manager of the PC 10, for example.

The maximum allowable CPU loads are not limited to the two levels of "35%" and "65%", and may be classified into three levels or more. In this manner, three or more priority levels can be set for the guest OS VMs 41, 42, and 43. Further, the maximum allowable CPU loads may be varied in accordance with the service fee required when a user uses the PC 10.

In the third embodiment, in response to a preferential utilization request from the guest OS VM 41, 42, or 43, the management OS VM 31 sets up preferential utilization for the guest OS VM 41, 42, or 43. Other than this arrangement, a user who can use the PC 10 preferentially may be registered in advance, and preferential utilization may be set up for the guest OS VM 41, 42, or 43 of the registered user only when this user sends a preferential utilization request.

Alternatively, each user may designate a time slot, and requests for preferential utilization. The management OS VM 31 may set up the preferential utilization for each of the guest OS VMs 41, 42, and 43 in the requested time slot. In such a case, the guest OS VMs 41, 42, and 43 can perform processes preferentially in the respective time slots. Thus, convenience for each user can be increased.

Fourth Embodiment

The following is a description of a PC according to a fourth embodiment. Since the PC of the fourth embodiment can be realized with the same configuration as the PC 10 of the first embodiment, the same components as those of the first embodiment are denoted by the same reference numerals as those used in the first embodiment, and explanation of the components is not repeated here.

In the first embodiment, to control the execution states of the application programs 50 being executed at the guest OS VMs 41, 42, and 43, the application programs 50 are "stopped" or "suspended". In the fourth embodiment, on the other hand, to control the execution states of the application programs 50, the size of the screen to be displayed on the corresponding one of the monitors 51a, 52a, and 53a is halved (½). This operation is described in the following.

Although not illustrated, the control method table 4d of the fourth embodiment stores "display size reduction (halving)" as a control method, as well as "stopped" and "suspended".

In the guest OS VMs 41, 42, and 43 of the fourth embodiment, the control unit 41d receives a notification of an application ID and a control method from the control method designating unit 41c.

When receiving a notification containing "display size reduction (halving)" as a control method, the control unit 41d of the fourth embodiment performs a display size reducing operation on the application program 50 represented by the application ID designated in the notification. Since the control unit 41d performs the display size reducing operation, the processing load of the application program 50 is reduced.

The control unit 41d first detects the size of the display screen that is currently displayed. The size of the display screen is set in each application program 50, and the control unit 41d can obtain the size of the currently displayed screen from the application program 50, for example. The control unit 41d then calculates the size of the display screen after a reduction. In a case where the current display size is 640×480 pixels, for example, the control unit 41d calculates the reduced display size as 320×240 pixels. The control unit 41d then starts displaying a display screen of the calculated reduced display size. Here, the control unit 41d causes the corresponding one of the monitors 51a, 52a, and 53a to display a notification screen to notify the user of the guest OS VM 41, 42, or 43 that the display size is to be reduced.

Except for the above described operation, the functions realized by the CPU 1 of the fourth embodiment perform the same operations as those of the first embodiment, and therefore, explanation of the operations is not repeated here.

Also, in the PC 10 of the fourth embodiment, the procedures to be performed by the management OS VM 31 to activate the guest OS VM 41, 42, or 43 are the same as the procedures of the first embodiment illustrated in FIG. 9, and therefore, explanation of the procedures is not repeated here.

The procedures to be performed by the management OS VM 31 when the processing load of the guest OS VMs 41, 42, and 43 becomes large in the PC 10 of the fourth embodiment are the same as the procedures of the first embodiment illustrated in FIGS. 10 and 11, and therefore, explanation of the procedures is not repeated here. The procedures to be performed by the guest OS VM 41, 42, or 43 of the fourth embodiment to control the execution state of the application program 50 are the same as the procedures illustrated in FIG. 11, except that "display size reduction" might be read at step S19. In this case, at step S22 of FIG. 11, the guest OS VM 41, 42, or 43 performs the operation to halve (½) the size of the display screen to be displayed by executing the application program 50.

The procedures to be performed by the management OS VM 31 to monitor the processing loads of the guest OS VMs 41, 42, and 43, and cancel the control on the application programs 50 having execution control performed thereon as needed in the PC 10 of the fourth embodiment are the same as the procedures of the first embodiment illustrated in FIGS. 12 and 13, and therefore, explanation of the procedures is not repeated here. Also, the procedures to be performed to end the processes of the guest OS VMs 41, 42, and 43 in the PC 10 of the fourth embodiment are the same as the procedures of the first embodiment illustrated in FIG. 14, and therefore, explanation of the procedures is not repeated here.

As described above, to reduce the processing loads of the application programs 50 being executed at the guest OS VM 41, 42, or 43, the operation to halve the size of the display screen to be displayed on the monitor 51a, 52a, or 53a is performed in the fourth embodiment. Through this operation, the processing loads of the application programs 50 are reduced, without a stop or a suspension of the execution of each application program 50. Although the size of each display screen is reduced, the execution of each application program 50 is not suspended. Accordingly, convenience for the users of the guest OS VMs 41, 42, and 43 is increased.

The size of each display screen to be reduced so as to reduce the processing loads of the application programs 50 may be arbitrarily varied in accordance with the amount of processing loads of the application programs 50.

Although the PC 10 of the fourth embodiment has been described as a modification of the PC 10 of the first embodiment, the configuration of the fourth embodiment may also be applied to each PC 10 of the second and the third embodiments.

Fifth Embodiment

The following is a description of a PC according to a fifth embodiment. Since the PC of the fifth embodiment can be realized with the same configuration as the PC 10 of the first embodiment, the same components as those of the first embodiment are denoted by the same reference numerals as those used in the first embodiment, and explanation of the components is not repeated here.

In the first embodiment, to control the execution states of the application programs 50 being executed at the guest OS VMs 41, 42, and 43, the application programs 50 are "stopped" or "suspended". In the fifth embodiment, on the other hand, to control the execution states of the application programs 50, the priority levels for allocating the CPU 1 required for executing the application programs 50 are varied. This operation is described in the following.

Although not illustrated, the control method table 4d of the fifth embodiment stores "lowering priority level for allocating CPU" as a control method, as well as "stopped" and "suspended".

In the guest OS VMs 41, 42, and 43 of the fifth embodiment, the control unit 41d receives a notification containing an application ID and a control method from the control method designating unit 41c.

When receiving a notification containing "lowering priority level for allocating CPU" as a control method, the control unit 41d of the fifth embodiment performs an operation to lower the priority level for allocating the CPU, with respect to the application program 50 represented by the application ID designated in the notification. Since the control unit 41d performs the operation to lower the priority level for allocating the CPU, the execution speed of the application program 50 becomes lower, and the processing load of the application program 50 is reduced.

More specifically, using the SetPriorityClass( ) function, which is one of the control functions provided through Windows of Microsoft Corporation, the control unit 41d performs the operation to lower the priority level for allocating the CPU to the application program 50, for example. More specifically, the control unit 41d sets the configuration information illustrated in FIG. 22 for the application program 50 represented by the application ID designated in the notification.

FIGS. 22A and 22B illustrate the configuration information to be used in the operation to lower the priority level for allocating the CPU. At "hProcess" in each of FIGS. 22A and 22B, the handle ID for identifying the application program 50 is written. The handle ID of the application program 50 is written in the application program 50, and the control unit 41d can obtain the handle ID from the application program 50.

Before performing the operation to lower the priority level for allocating the CPU to the application program 50, the control unit 41d also causes the corresponding one of the monitors 51a, 52a, and 53a to display a notification screen to notify the user of the guest OS VM 41, 42, or 43 that the operation is to be performed.

Except for the above described operation, the functions realized by the CPU 1 of the fifth embodiment perform the same operations as those of the first embodiment, and therefore, explanation of the operations is not repeated here.

Also, in the PC 10 of the fifth embodiment, the procedures to be performed by the management OS VM 31 to activate the guest OS VM 41, 42, or 43 are the same as the procedures of the first embodiment illustrated in FIG. 9, and therefore, explanation of the procedures is not repeated here.

The procedures to be performed by the management OS VM 31 when the processing load of the guest OS VMs 41, 42, and 43 becomes large in the PC 10 of the fifth embodiment are the same as the procedures of the first embodiment illustrated in FIGS. 10 and 11, and therefore, explanation of the procedures is not repeated here. The procedures to be performed by the guest OS VM 41, 42, or 43 of the fifth embodiment to control the execution state of the application program 50 are the same as the procedures illustrated in FIG. 11, except that "lowering priority level for allocating CPU" might be read at step S19. In this case, at step S22 of FIG. 11, the guest OS VM 41, 42, or 43 performs the operation to lower the priority level for allocating the CPU to the application program 50.

The procedures to be performed by the management OS VM 31 to monitor the processing loads of the guest OS VMs 41, 42, and 43, and cancel the control on the application programs 50 having execution control performed thereon as needed in the PC 10 of the fifth embodiment are the same as the procedures of the first embodiment illustrated in FIGS. 12 and 13, and therefore, explanation of the procedures is not repeated here. Also, the procedures to be performed to end the processes of the guest OS VMs 41, 42, and 43 in the PC 10 of the fifth embodiment are the same as the procedures of the first embodiment illustrated in FIG. 14, and therefore, explanation of the procedures is not repeated here.

As described above, to reduce the processing loads of the application programs 50 being executed at the guest OS VM 41, 42, or 43, the operation to lower the priority level for allocating the CPU 1 to the application programs 50 is performed in the fifth embodiment. Through this operation, the processing loads of the application programs 50 are reduced, without a stop or a suspension of the execution of each application program 50. Although the processing speed of the application programs 50 is lowered, the execution of each application program 50 is not suspended. Accordingly, convenience for the users of the guest OS VMs 41, 42, and 43 is increased.

The SetPriorityClass( ) function is used in the operation to lower the priority level for allocating the CPU 1 to the application programs 50. However, the embodiment is not limited to that method, and the processing time for the CPU 1 may be divided to lower the allocation rate for each application program 50 being executed.

Although the PC 10 of the fifth embodiment has been described as a modification of the PC 10 of the first embodiment, the configuration of the fifth embodiment may also be applied to each PC 10 of the second and the third embodiments.

Sixth Embodiment

Figure 23:
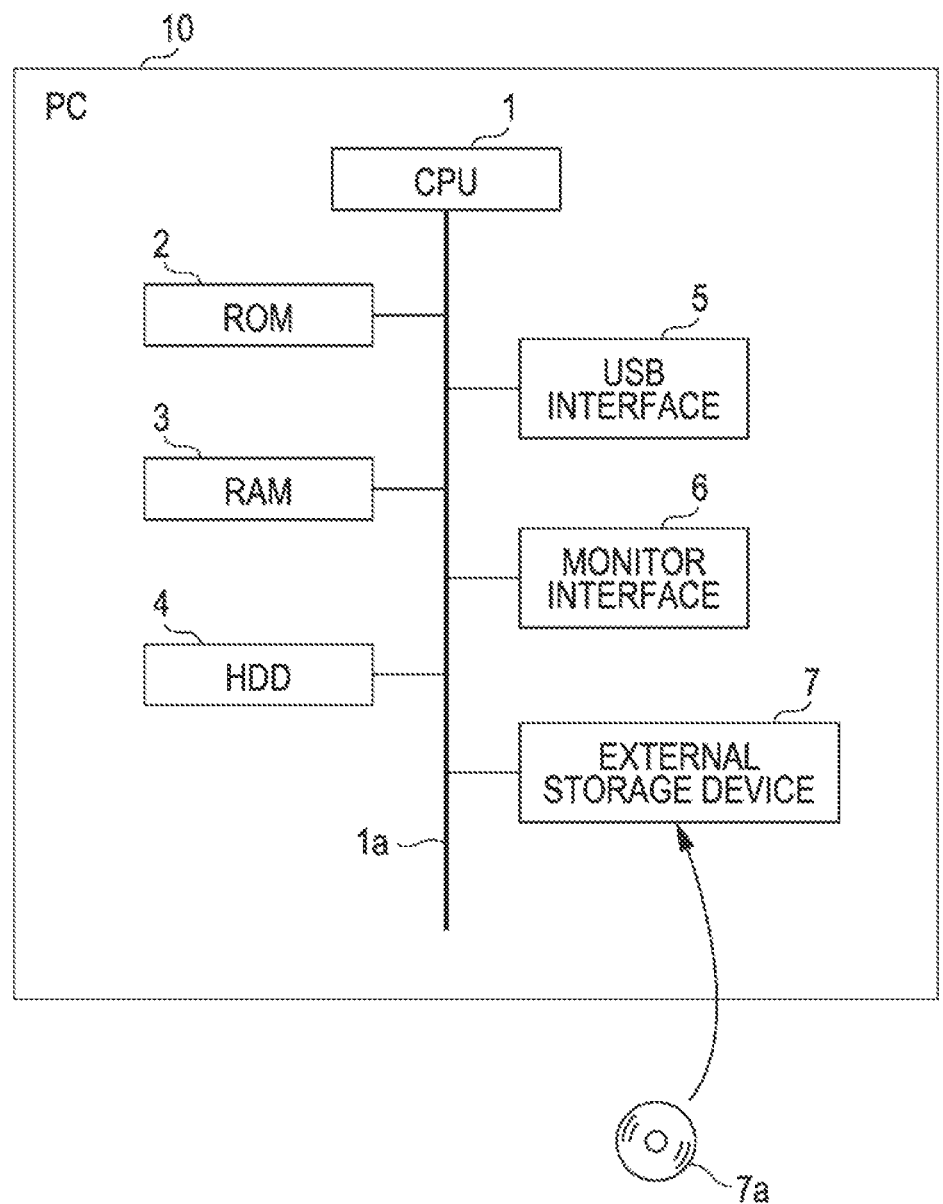
FIG. 23 illustrates a general configuration of a PC of a sixth embodiment.

The following is a description of a PC according to a sixth embodiment. FIG. 23 illustrates a general configuration of the PC of the sixth embodiment. The PC 10 of the sixth embodiment includes an external storage device 7, as well as the hardware components illustrated in FIG. 2. The external storage device 7 may be a CD-ROM drive or a DVD drive, for example. The external storage device 7 reads data from a recording medium 7a that is a CD ROM, a DVD-ROM, or the like.

In the recording medium 7a, the control programs used and/or necessary for the PC 10 to function as described in the foregoing embodiments are recorded. The external storage device 7 loads the control programs from the recording medium 7a into the HDD 4, for example. The CPU 1 reads the control programs from the HDD 4 into the RAM 3, and executes each of the control programs. With this arrangement, the PC 10 of the sixth embodiment performs the same operations as those performed by the PCs 10 described in the foregoing embodiments.

Other than a CD-ROM and a DVD-ROM, the recording medium 7a may be any kind of recording medium such as a flexible disk, a memory card, or a USB memory.

The PC 10 may also include a communication unit for establishing a connection with a network such as the Internet or a LAN (Local Area Network). In such a case, the PC 10 may download, via the network, the control programs necessary for the PC 10 to function as described in the foregoing embodiments, and store the control programs into the HDD 4, for example.

In each example described in the first through the sixth embodiments, a virtualization technique is applied to one PC 10, and a plurality of input/output device sets 51, 52, and 53 are connected directly to the PC 10, so that the PC 10 can be shared. In a thin client system, the hardware of a server device is virtualized, and this server device is shared among a plurality of users via a network. Each information processing device of the embodiment may be used as such a server device in a thin client system.

In each information processing device disclosed in the present invention, a balance can be maintained among the processing loads of the respective operation units without a change in the operation units, when the total amount of the processing loads of the operation units becomes equal to or larger than a specific value. Accordingly, convenience can be evenly secured for the users of the respective operation units.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. An information processing device comprising:
    a processor; and
    a memory coupled to the processor,
    wherein the processor, as a plurality of virtual machines based on a program stored in the memory, executes processes of:
        processing a plurality of processes each of which corresponds to each of the plurality of virtual machines;
        detecting processing loads of the plurality of processes;
        determining whether a first total amount of the processing loads is equal to or larger than a first value;
        identifying, using virtual machine management information, a process having an execution state to be controlled from the plurality of processes when the first total amount of the processing loads is equal to or larger than the first value;
        reducing a load of the identified process by any one of suspending the identified process, stopping the identified process, and reducing resources for displaying the identified process;
        cancelling the any one of suspending the identified process, stopping the identified process, and reducing resources for displaying the identified process, based on a second total amount of processing loads, which is determined after the reducing the load of the identified process, by the plurality of virtual machines;
        calculating a difference by the cancellation of the any one of suspending the identified process, stopping the identified process, and reducing resources for displaying the identified process; and
        updating the virtual machine management information by subtracting the calculated difference from the processing loads corresponding to the plurality of virtual machines included in the virtual machine management information;
        updating the execution state, corresponding to the plurality of virtual machines, in the virtual machine management information; and
        when each of the updated processing loads corresponding to the plurality of virtual machines is a value corresponding to an uncontrolled state, updating the execution state corresponding to each of the plurality of virtual machines to the uncontrolled state in the virtual machine management information.

2. The information processing device according to claim 1, wherein determining whether a first total amount of the processing loads is equal to or larger than a first value includes, clocking a period of time during which the total amount of the detected processing loads is equal to or larger than the first value, and when the clocked period of time reaches a specific period of time, determining that the total amount is equal to or larger than the first value for the specific period of time.

3. The information processing device according to claim 1, wherein identifying the process having the execution state to be controlled is based on the detected processing loads and preset allowable loads.

4. An information processing method using an information processing device which has a plurality of process units for performing various kinds of processes, the information processing method comprising:
    detecting processing loads of each of the process units;
    determining whether a first total amount of the detected processing loads is equal to or larger than a first value;
    identifying, using virtual machine management information, a process having an execution state to be controlled from the plurality of processes when the first total amount of the processing loads is equal to or larger than the first value;
    reducing a load of the identified process by any one of suspending the identified process, stopping the identified process, and reducing resources for displaying the identified process;
    cancelling the any one of suspending the identified process, stopping the identified process, and reducing resources for displaying the identified process, based on a second total amount of processing loads, which is determined after the reducing the load of the identified process;
    calculating a difference by the cancellation of the any one of suspending the identified process, stopping the identified process, and reducing resources for displaying the identified process; and
    updating the virtual machine management information by subtracting the calculated difference from the processing loads corresponding to the plurality of virtual machines included in the virtual machine management information;
    updating the execution state, corresponding to the plurality of virtual machines, in the virtual machine management information; and
    when each of the updated processing loads corresponding to the plurality of virtual machines is a value corresponding to an uncontrolled state, updating the execution state corresponding to each of the plurality of virtual machines to the uncontrolled state in the virtual machine management information.

5. The information processing method according to claim 4, further comprising:
    clocking a period of time during which the total amount of the detected processing loads is equal to or larger than the first value; and
    determining that the total amount is equal to or larger than the first value when the clocked period of time is equal to or larger than a specific period of time.

6. The information processing method according to claim 4, wherein identifying the process having the execution state to be controlled is based on the detected processing loads and preset allowable processing loads.

7. A non-transitory computer-readable storage medium storing a program, the program causing a computer an information processing device which has a plurality of process units for performing various kinds of processes, to perform:
    identifying, using virtual machine management information, a process having an execution state to be controlled from the plurality of processes when the first total amount of the processing loads is equal to or larger than the first value;

reducing a load of the identified process by any one of suspending the identified process, stopping the identified process, and reducing resources for displaying the identified process;

cancelling the any one of suspending the identified process, stopping the identified process, and reducing resources for displaying the identified process, based on a second total amount of processing loads, which is determined after the reducing the load of the identified process;

calculating a difference by the cancellation of the any one of suspending the identified process, stopping the identified process, and reducing resources for displaying the identified process; and updating the virtual machine management information by subtracting the calculated difference from the processing loads corresponding to the plurality of virtual machines included in the virtual machine management information;

updating the execution state, corresponding to the plurality of virtual machines, in the virtual machine management information; and when each of the updated processing loads corresponding to the plurality of virtual machines is a value corresponding to an uncontrolled state, updating the execution state corresponding to each of the plurality of virtual machines to the uncontrolled state in the virtual machine management information.

8. The computer-readable storage medium according to claim 7, further comprising:

clocking a period of time during which the total amount of the detected processing loads is equal to or larger than the first value; and determining that the total amount is equal to or larger than the first value when the clocked period of time is equal to or larger than a specific period of time.

9. The computer-readable storage medium according to claim 7, wherein identifying the process having the execution state to be controlled is based on the detected processing loads and preset allowable processing loads.

* * * * *